(12) United States Patent
Makanawala et al.

(10) Patent No.: US 9,230,257 B2
(45) Date of Patent: Jan. 5, 2016

(54) SYSTEMS AND METHODS FOR CUSTOMER RELATIONSHIP MANAGEMENT

(71) Applicants: Prerna Makanawala, Mountain View, CA (US); Claus Wallacher, Belmont, CA (US); Janani Bhuvaneswari Sundar, Mountain View, CA (US); Jaideep Godara, Fremont, CA (US); Rei Kasai, San Mateo, CA (US); Terence Chesire, Foster City, CA (US); Venkitesh Subramanian, Cupertino, CA (US); Jothish Karunakaran, Sunnyvale, CA (US); Krithika Manohar, Sunnyvale, CA (US)

(72) Inventors: Prerna Makanawala, Mountain View, CA (US); Claus Wallacher, Belmont, CA (US); Janani Bhuvaneswari Sundar, Mountain View, CA (US); Jaideep Godara, Fremont, CA (US); Rei Kasai, San Mateo, CA (US); Terence Chesire, Foster City, CA (US); Venkitesh Subramanian, Cupertino, CA (US); Jothish Karunakaran, Sunnyvale, CA (US); Krithika Manohar, Sunnyvale, CA (US)

(73) Assignee: SAP SE, Walldorf (DE)

(*) Notice: Subject to any disclaimer, the term of this patent is extended or adjusted under 35 U.S.C. 154(b) by 115 days.

(21) Appl. No.: 13/712,608

(22) Filed: Dec. 12, 2012

(65) Prior Publication Data

US 2013/0262598 A1 Oct. 3, 2013

Related U.S. Application Data

(60) Provisional application No. 61/646,052, filed on May 11, 2012, provisional application No. 61/618,541, filed on Mar. 30, 2012.

(51) Int. Cl.
G06F 15/16 (2006.01)
G06Q 30/00 (2012.01)
G06Q 50/00 (2012.01)
H04L 12/58 (2006.01)

(52) U.S. Cl.
CPC .............. G06Q 30/016 (2013.01); G06Q 50/01 (2013.01); H04L 51/32 (2013.01); H04L 51/14 (2013.01)

(58) Field of Classification Search
CPC ....................................................... H04L 51/32
USPC .................................................. 709/204, 206
See application file for complete search history.

(56) References Cited

U.S. PATENT DOCUMENTS

| 8,943,145 B1* | 1/2015 | Peters et al. ................... 709/206 |
| 2007/0033217 A1 | 2/2007 | Basner |
| 2010/0228582 A1* | 9/2010 | King et al. ........................ 705/7 |
| 2011/0113349 A1* | 5/2011 | Kiciman et al. ............... 715/753 |

(Continued)

OTHER PUBLICATIONS

U.S. Appl. No. 13/712,668, Response filed Apr. 20, 2015 to Restriction Requirement mailed Feb. 18, 2015, 7 pgs.

(Continued)

*Primary Examiner* — Hamza Algibhah
(74) *Attorney, Agent, or Firm* — Schwegman Lundberg & Woessner, P.A.

(57) ABSTRACT

According to various embodiments, a social media message posted on a social media system is accessed. One or more similar messages determined to be similar to the social media message may be selected from a database of previously posted messages, based on, for example, an author, product, problem, keyword, etc., identified in the social media message. The similar messages may be displayed in a similar message recommendation list of a user interface. One or more relevant knowledgebase articles determined to be relevant to the social media message may be selected from a knowledgebase repository, based on, for example, a product, problem, keyword, etc., identified in the social media message. The relevant knowledgebase articles may be displayed in a knowledgebase article list of a user interface.

14 Claims, 25 Drawing Sheets

(56) References Cited

U.S. PATENT DOCUMENTS

| | | | |
|---|---|---|---|
| 2011/0137989 A1* | 6/2011 | Kiciman et al. | 709/204 |
| 2011/0179114 A1* | 7/2011 | Dilip et al. | 709/204 |
| 2011/0320542 A1* | 12/2011 | Bendel et al. | 709/206 |
| 2012/0005106 A1* | 1/2012 | Famous | 705/304 |
| 2012/0072358 A1* | 3/2012 | Famous et al. | 705/319 |
| 2012/0079020 A1* | 3/2012 | Park et al. | 709/204 |
| 2012/0124073 A1* | 5/2012 | Gross et al. | 707/767 |
| 2012/0195422 A1 | 8/2012 | Famous | |
| 2012/0254798 A1* | 10/2012 | Bickel et al. | 715/817 |
| 2012/0278164 A1* | 11/2012 | Spivack et al. | 705/14.52 |
| 2013/0024389 A1* | 1/2013 | Gupta | 705/319 |
| 2013/0054517 A1 | 2/2013 | Beechuk et al. | |
| 2013/0091223 A1* | 4/2013 | DeLuca et al. | 709/206 |
| 2013/0151632 A1* | 6/2013 | Chodavarapu et al. | 709/206 |
| 2013/0262168 A1 | 10/2013 | Makanawala et al. | |
| 2013/0262320 A1 | 10/2013 | Makanawala et al. | |

OTHER PUBLICATIONS

U.S. Appl. No. 13/712,668, Restriction Requirement mailed Feb. 18, 2015, 6 pgs.

U.S. Appl. No. 13/712,668, Non Final Office Action mailed Jul. 13, 2015, 18 pgs.

* cited by examiner

10

*Fig. 6*   Recommended Messages

| Title | Product | Date Closed | Closed by |
|---|---|---|---|
| My auto optimiser is not working, do I need to... | XOS 600D | 7/13/2010 | Aaron S |
| I need to change my ISO settings for XOS Camera | 100x Lens | 4/15/2010 | Larry T |
| I need to install memory for my XOS Camera | XOS series | 7/13/2010 | Larry T |
| Could you provide me easy steps to update memory | XOS 600D | 6/8/2010 | Aaron S |
| Could you provide I need to change my ISO settings | 100x Lens | 7/13/2010 | Larry T |
| How to install memory for XOS 100 | XOS series | 4/15/2010 | Aaron S |
| My auto optimiser is not working, do I need to | XOS 600D | 7/13/2010 | Larry T |
| How to install memory for XOS 1199 | 100x Lens | 6/8/2010 | Aaron S |

Table View
601

Chunk View

Message ID and message
Thumbnail (message)
Two relevant lines from article or two relevant lines of agent's reply

602

Message ID: 123345, I have an issue with my XOS camera 600
D ...
Here is the solution for the XOS 600D optimizing problem.
Please click on http://bit.ly/123 to download the latest update.
Agent:  Aaron Smith          Date Closed: 12/02/2009

SOLUTION FINDER — 1600

| Articles | Messages | | | Search |
|---|---|---|---|---|

Recommendations are based on: Keyword 01, Keyword 02

| Topic Name/Article Title | Source | Date | Action |
|---|---|---|---|
| Specs to upgrade driver... | Photon Specs | 8/10/11 | + |
| How to install driver... | Photon Wiki | m/d/yy | + |
| Manual to install driver... | Photon Manuals | m/d/yy | + |
| Easy step process... | Photon Downloads | m/d/yy | + |
| Troubleshoot document... | Photon Manuals | m/d/yy | + |
| Specs to install driver... | Photon Camera | m/d/yy | + |
| How to upgrade driver... | Photon Wiki | m/d/yy | + |
| Mnual to upgrade driver... | Photon Manuals | m/d/yy | + |

Search messages and articles

Action to add article links (tiny url) to conversation

Title with KB object icon (icon from visual design)

Default: 15 items in table view ~ 460px height & 540 px width (with padding)

*Fig. 16*

SYSTEMS AND METHODS FOR CUSTOMER RELATIONSHIP MANAGEMENT

CROSS REFERENCE TO RELATED APPLICATIONS

This application claims the priority benefits of U.S. Provisional Application No. 61/618,541, filed Mar. 30, 2012 and U.S. Provisional Application No. 61/646,052, filed May 11, 2012 which are both incorporated herein by reference in their entirety.

TECHNICAL FIELD

This patent document pertains generally to tools for customer service, and more particularly, but not by way of limitation, to systems and methods for customer relationship management.

BACKGROUND

In conventional approaches to customer service, customer relationship management ("CRM") call centers of companies receive customer inquiries via traditional channels of communication, such as telephone calls and emails. The customer service agents of the company typically respond to the customers via the same channels of communication, which allows the company to address any customer issues with a degree of privacy and confidentiality.

Now, a new channel for expresing customer issues is emerging—the Social Media space. For example, many companies and other organizations have their own social media presence, such as a TWITTER® feed, or a FACEBOOK® page with a wall, such that users can post messages regarding that company and its products that are widely viewable.

BRIEF DESCRIPTION OF THE DRAWINGS

Some embodiments are illustrated by way of example and not limitation in the figures of the accompanying drawings in which:

FIG. 6 illustrates example portions of a user interface, according to various embodiments.

FIG. 15 illustrates an example portion of a user interface, according to various embodiments.

FIG. 16 illustrates an example portion of a user interface, according to various embodiments.

DETAILED DESCRIPTION

In the following description, for purposes of explanation, numerous specific details are set forth in order to provide a thorough understanding of some example embodiments. It may be evident, however, to one skilled in the art that the present invention may be practiced without these specific details.

Overview

A "social activity management system" described in various embodiments may receive social media postings from social media users and facilitate the management of a company's resources to resolve the problems that are described in the social media postings. The description of problems in the social media postings may be related to a company's products/services. The problems may be resolved by utilizing the resources of the social activity management system including agents, experts, local and third party knowledgebases as well as a multiplicity of internal systems that facilitate the prioritization, management, and resolution of customer problems. To this end, the social activity management system (also referred to as "Service OnDemand" throughout this disclosure) may be utilized to manage interactions with the customer until the problem is resolved.

Figure 1:
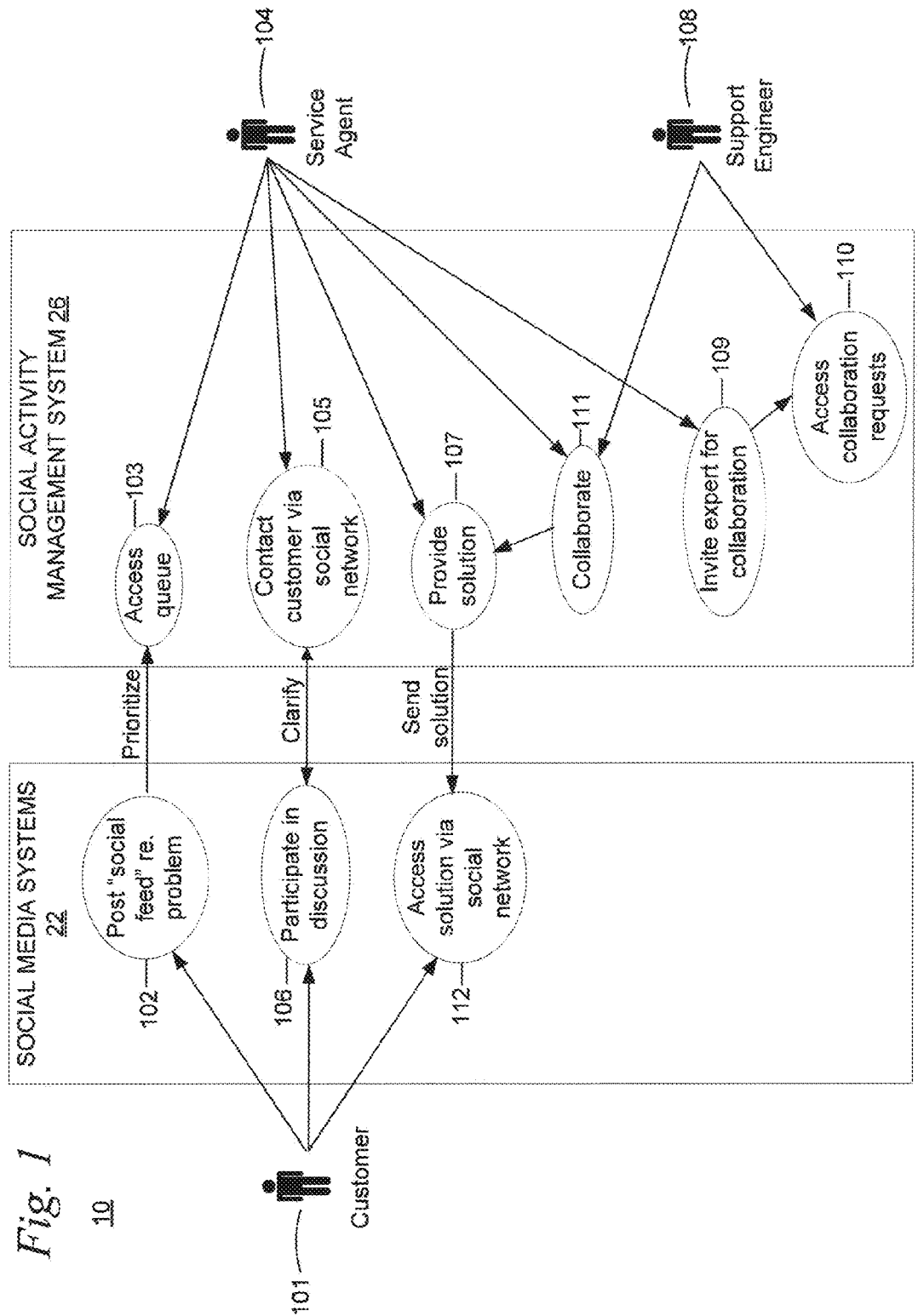
FIG. 1 is a schematic diagram depicting a data flow, within which one example embodiment may be deployed.

FIG. 1 is a schematic diagram depicting a data flow with respect to various social activity management systems, such as the aforementioned social activity management system. In particular, FIG. 1 illustrates user case scenarios 10 anticipated in the utilization of the social activity management system to resolve customer problems. The user case scenarios 10 may include social media systems 22 (e.g., social media platforms or social networking platforms) on the left and social activity management system 26 on the right. A typical problem resolution is illustrated. Broadly, a customer 101 on the left posts a social media message (such as a "social feed" 102 about a problem) to the social media systems 22 that, in turn, communicate the social media message 102 to the social activity management system 26 where it is analyzed and prioritized 103 before being inserted into a queue. A service agent 104 may review the queue and assign the social media message to his/her self for resolution. The service agent 104 may clarify the problem by utilizing the social media systems 22 to further communicate with the customer in 105, where the customer may participate in this discussion in 106. Not shown are various systems/services that the service agent 104 may utilize to resolve the problem and provide a solution at 107. These systems are briefly described below and extensively described later in this disclosure. Towards resolution of the problem, the service agent may invite a support engineer 108 to collaborate in 109, where the support engineer 108 may accept the collaboration request at 110. The support engineer 108 may accept the invitation to collaborate at 110 and collaborate with the service agent at 111 in finding a solution to the problem at 107. Finally, the solution may be communicated in social media to the customer at 112. While the service agent 104 and support engineer 108 are shown as being external to the social activity management system 26 in FIG. 1, such agents and engineers may also be viewed as being included in the social activity management system 26, as described in more detail below.

Figure 2:
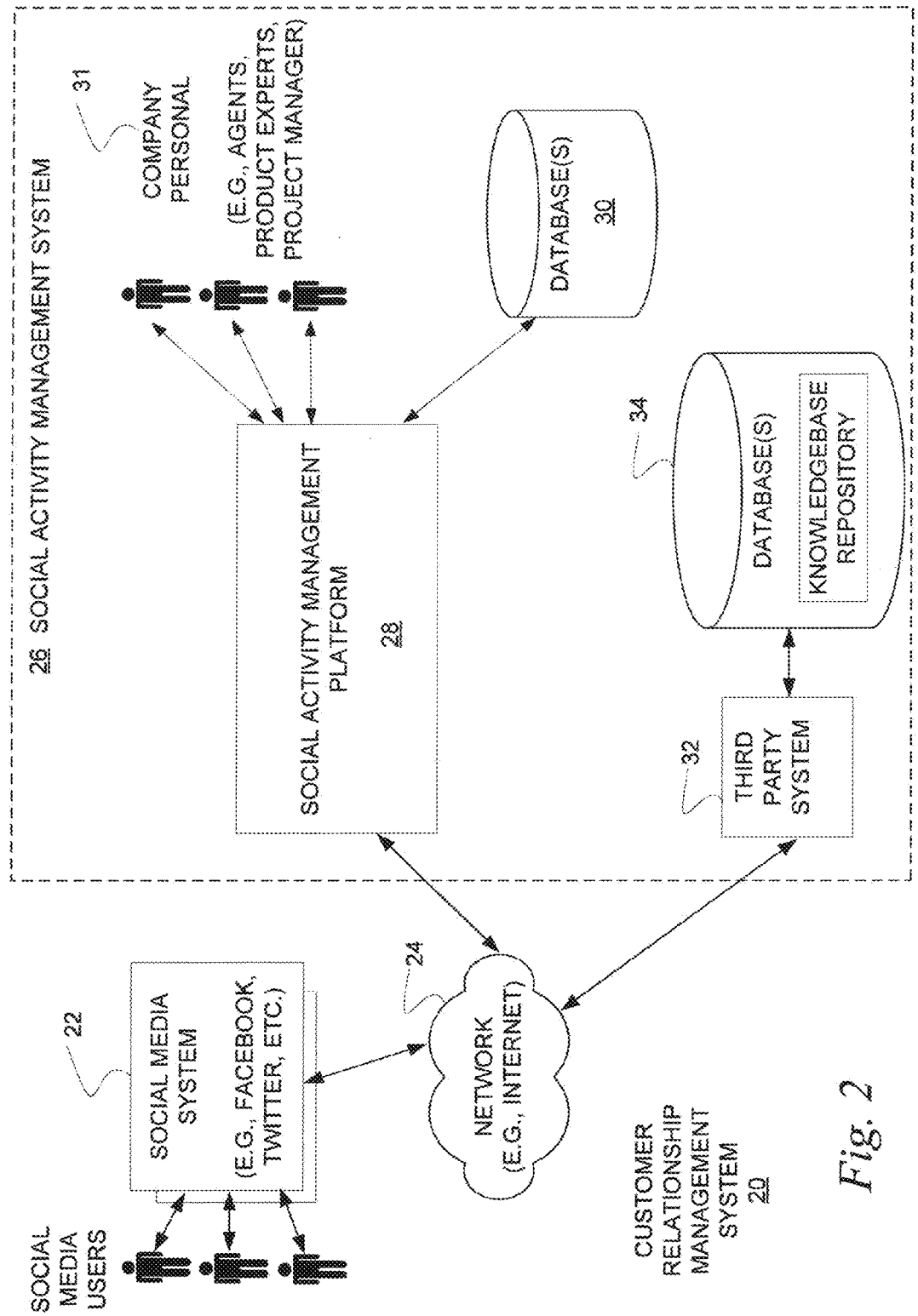
FIG. 2 is a block diagram of an example system, according to various embodiments.

FIG. 2 is a block diagram illustrating a customer relationship management system 20, according to an embodiment that may be implemented to address the previously described user case scenarios 10 (see FIG. 1). The customer relationship management system 20 may include the social media systems 22 (e.g., social media platforms or social networking platforms), a network 24 (e.g., Internet), and the social activity management system 26. The social media system 22 may be utilized by social media users (e.g., users) who operate client computers (not shown) that are connected over the network 24 with the social media system 22 to exchange social media messages/postings with the social activity management system 26. The social media system 22 may be embodied as FACEBOOK®, a social networking service and website launched in February 2004, operated and privately owned by Facebook Inc. of Menlo Park, Calif. or TWITTER®, an online social networking service and microblogging service that enables its users to send and read text-based posts of up to 140 characters, known as "tweets," operated by Twitter Inc. of San Francisco, Calif. A social media message may be communicated by the customer via one of multiple portals on the social media system 22 (e.g., company wall, etc.) to a particular company and describe a problem with a product or service that is provided by the company. The social media system 22, in turn, may communicate the social media message over the network 24 to the social activity management system 26.

The social activity management system 26 may include a social activity management platform 28 that is coupled to a database 30, and a third party system 32 that is coupled to another database 34. The social activity management platform 28 may communicate over the network 24 with the social media system 22, the third party system 32, and company personal 31 (e.g., service agent) who operate client computers that are connected with the social activity management platform 28. The social activity management platform 28 is further shown to be coupled to a database 30 that stores information.

The social activity management system 26 may communicate contextual content in a single user interface. For example, content identified by the social activity management system 26 (e.g., similar messages, knowledgebase articles, product, customer) may be included in a single user interface, as described in various embodiments below.

Figure 3:
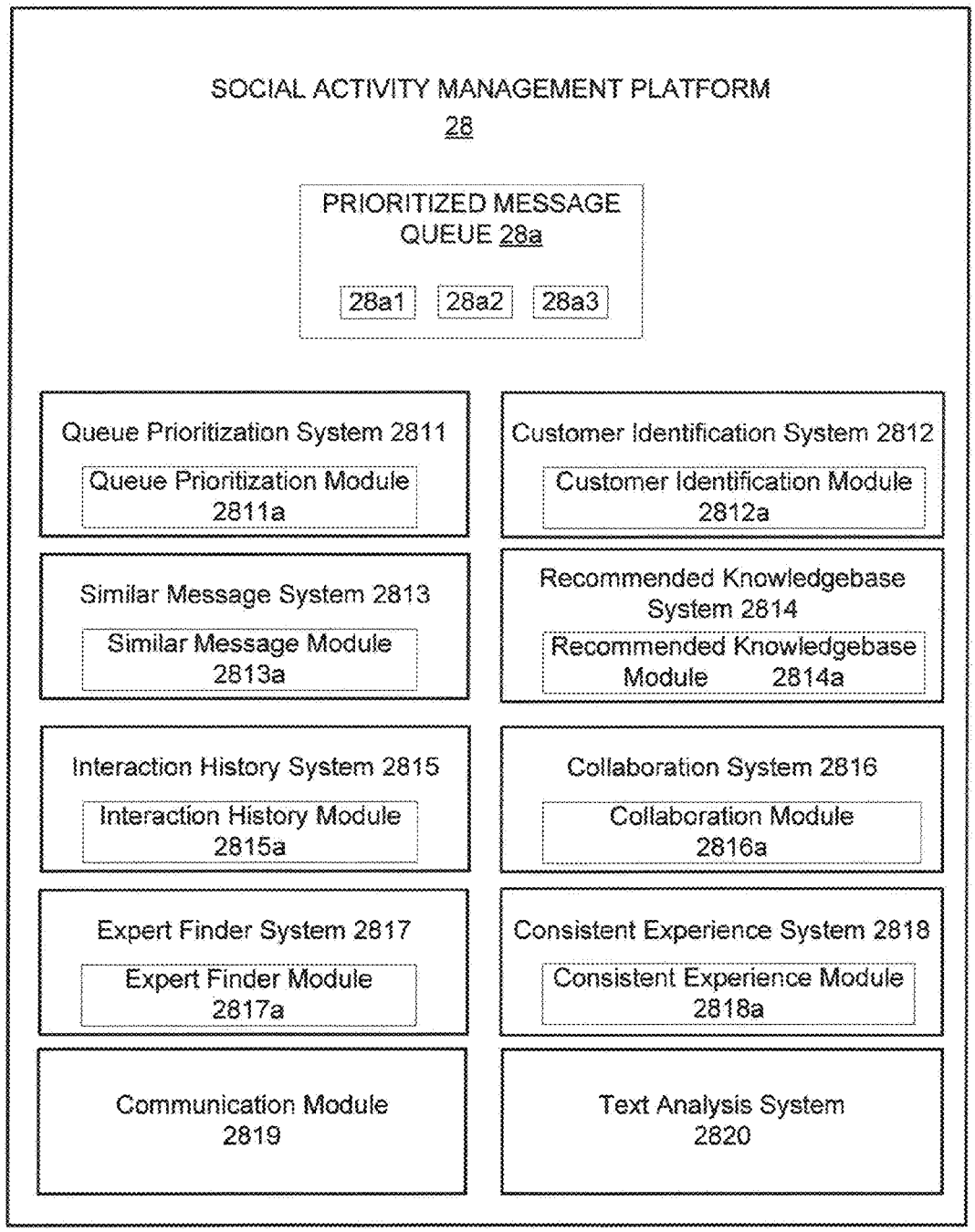
FIG. 3 is a block diagram of a social activity management platform, according to various embodiments.

FIG. 3 is a block diagram illustrating the social activity management platform 28, according to an embodiment. The social activity management platform 28 may include a prioritized message queue 28a that includes social media messages 28a1, 28a2, 28a3, etc., as well as multiple systems 2811-2818 respectively including hardware or software modules 2811a-2818a that are utilized to manage social media messages, a communication module 2819 that is utilized to communicate with the social media system 22 and a text analysis system 2820, as described below. The systems 2811-2818 may include a queue prioritization system 2811 that includes a queue prioritization module 2811a, a customer identification system 2812 that includes a customer identification module 2812a, a similar message system 2813 that includes a similar message module 2813a, a recommended knowledgebase system 2814 that includes recommended knowledgebase module 2814a, an interaction history system 2815 that includes an interaction history module 2815a, a collaboration system 2816 that includes a collaboration module 2816a, an expert finder system 2817 that includes an expert finder module 2817a, and a consistent experience system 2818 that includes a consistent experience module 2818a.

The queue prioritization system 2811 may be utilized to provide auto prioritization of the message queue containing incoming social media messages to help agents focus on high profile customers and key issues. The queue prioritization system may be utilized to evaluate incoming social media messages based on different parameters including but not limited to customer influence, message sentiment, customer level and service level agreement (SLA). These parameters may be computed into a single priority score which determines and assigns a priority (e.g., Urgent, Normal and Low) to each message.

The customer identification system 2812 may be utilized to automatically identify the customer and create a customer record in the database 30. The customer record may be created with information in the customers' social profile. The customer identification system may further map the social customer identity (e.g., social media system identity) to an internal customer record. If there are multiple customers with same name, the customer identification system may display a list of matching customers thereby enabling a service agent to identify a customer based on the available information.

The similar message system 2813 may be utilized to display messages that are similar to the social media message that is presently being processed by the service agent. The similar message may include a response/solution that may be applicable to the social media message and utilized by the service agent to resolve the problem.

The recommended knowledgebase system 2814 may be utilized to recommend articles and other documents to the customer that may be helpful in resolving the problem of the customer. The recommended knowledgebase system may utilize the text analysis system 2820 to perform a text analysis and keyword identification of the social media message to identify a product and issue(s) in the social media message. The recommended knowledgebase system 2814 may utilize the identified product and issue to provide a recommendation of articles to the customer that may be attached as links in a response that is communicated to the customer. The recommended knowledgebase system 2814 may retrieve articles from a knowledgebase repository 3004 that is stored on the database 30 (see FIG. 4) or, via the third party system 32, from a knowledgebase repository that is stored on the database 34 (see FIG. 3).

The interaction history system 2815 may be utilized to respond to the customer, takes notes and collaborate internally with other agents in such a way that all the information is recorded to show a complete history of interactions with the customer in a chronological order. Accordingly, reassignment of the social media message to another agent or escalation to another agent may not hinder the newly assigned agent in responding to the customer because the newly assigned agent may utilize the history of interactions.

The collaboration system 2816 may be utilized to locate specific colleagues and then collaborate with them to resolve the problem described in the social media message. The collaboration system 2816 may ensure that all collaborators have access to information regarding the problem described in the social media message. The collaboration system 2816 may further ensure that interactions between collaborators are contained within the interaction history associated with the social media message.

The expert finder system 2817 may be utilized to automatically identify and present a list of experts that are available to the company based on the text analysis of social media message. The expert finder system 2817 may utilize the text analysis system 2820 to identify the product and other keywords mentioned in the social media message and provide a list of recommended experts within the context of the social media message.

The consistent experience system 2818 may be utilized to automatically aggregate information about the social media messages, other types of messages (e.g., email, telephone, etc.), and interaction history for a particular customer and automatically present this information to the service agent.

According to various embodiments, the above described aspects and/or functions of each of the systems 2811-2818 may be implemented and/or performed by the modules 2811a-2818a, respectively (see FIG. 3), which may correspond to hardware modules or software modules executed by one or more processors.

Figure 4:
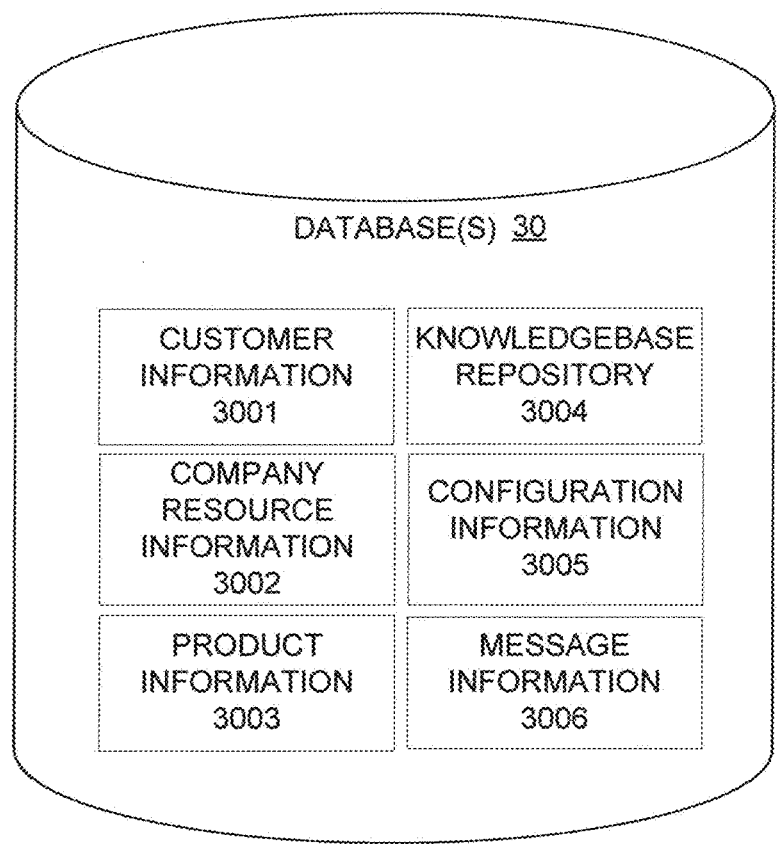
FIG. 4 is a block diagram of a database, according to various embodiments.

FIG. 4 is a block diagram illustrating the database 30, according to an embodiment. The database 30 may store customer information 3001, company resource information 3002, product information 3003, a knowledgebase repository 3004, configuration information 3005 and message information 3006. The customer information 3001 may be customer records that include information that describe the customer (e.g., identity information) and information that describes interactions with the customer. The company resource information 3002 may include a personal profile for each of the employees of the company including the domains in which a particular employee has acquired knowledge that may be useful in resolving problems and a level of sufficiency for each of the domains. The product information 3003 may include product catalogues including profiles describing products. The knowledgebase repository 3004 may be utilized to store articles and other documents that may be communicated to customers to facilitate a resolution of a problem. The configuration information 3005 may include parameters that may be configured by an administrator of the social activity management platform to customize one of the above mentioned systems.

1: Similar Messages

In the current social media space, there may be a large number of messages from customers regarding various issues with a company's products or services, where the messages may be posted on a social media system, for example. Applicants have determined that, despite the large volume of such messages, a pattern of similar and duplicated customer issues arise.

As a result, a wide number of customer service agents handling these customer messages spend a great deal of time working on similar and duplicated issues, while at the same time trying to find solutions and responses in different systems, which hinders prompt and accurate resolution of customer issues and adds to the company costs.

According to an exemplary embodiment, when an agent accesses a social media message to develop a response, the similar message system 2813 may display similar messages received from the same or other users, as well as the status of any response to the similar messages (e.g. closed, in process, etc.). This may provide the agent analyzing a customer issue in a message with an immediate solution to resolve the current issue, as well as providing the agent with the means to see how the others agent may be addressing (or have addressed) a similar problem. Further, the similar message system 2813 may provide the agent with the ability to quickly contact and collaborate with the other agents, in order to help solve the issue.

Figure 5:
FIG. 5 illustrates an example portion of a user interface, according to various embodiments.

FIG. 5 illustrates a user interface 500 of the similar message system 2813 that includes a customer identification area 501, a product identification area 502, a message activity area 503 and a solution finder area 505. A social media message 503a posted by a customer is displayed in message activity area 503, as described in more detail below.

The customer identification area 501 may include identification information describing the identity of the customer that posted the social media message 503a. The identification information may have been retrieved from the social media message 503a (such as name, username, email, location gender, contact #, classification). For example, the similar message system 2813 may request the text analysis system 2820 to perform a text analysis of the content (e.g. words) of the social media message 503a to detect the aforementioned identification information in the social media message 503a. The identification information may also be retrieved from the company's internal customer records (e.g., customer information 3001 in FIG. 4) or from publically available social media profiles. The identification information may include information such as message sentiment history, internal customer classification as "platinum" customer or "gold" customer, etc., that are obtained from the company's internal customer records or from publically available social media profiles. The identification information describing the customer may be generated by the customer identification system 2812. According to one embodiment, the customer identification system 2812 may include a customer identification module 2812a that generates the identification information.

The product identification area 502 may include product information describing a product that was identified based on the social media message 503a. According to an embodiment, the product information may be identified with a text analysis of the social media message 503a. For example, the customer identification system 2812 may request the text analysis system 2820 to perform an analysis of the content (e.g. words) of the social media message 503a, in order to determine a particular product that is the referenced by the social media message. For example, the similar message system 2813 may access an internal list that is stored in the database 30. For example, the list may be embodied as product information 3003 (as shown in FIG. 4) that includes words or phrases that describe known products such as "TV", "processor", "camera 600D" and so forth that, if detected in the social media message 503a, through text analysis, indicates a particular product is being referenced by the social media message 503a. The product identification area 502 is then utilized by the similar message system 2813 to display the product information in the product identification area 502.

The message activity area 503 may include a social media message 503a and an interaction history of one or more messages that chronicle the resolution of a given problem. For example, social media message 503a may be positioned at the top of the message activity area 503 that corresponds to a social media message posted by a user on a social media platform. The social media message 503a may refer to a company, a product of the company, a service of the company, and issue or problem, etc. and may be assigned to an agent to resolve. The social media message 503a may be displayed in the same format in which it appears on the social media system. The message 503a is shown to be further supplemented with other information from the social media system 22 including a time and place of posting the message, the number of likes, comments, shares, follows, views, repostings, etc., of the message, as well as any media files (e.g. video, audio, photos) that the user posted to the social media system 22 in connection with the message. The message activity area 503 also includes other messages that collectively provide a chronological history of all internal actions that have been taken by company employees (e.g., agents, product experts and project managers of the social activity management system 26 described in FIG. 2) with regards to the assigned message. As seen in FIG. 5, the message activity area 503 may include an internal message number assigned to the message by the social activity management platform 28, a particular company customer service agent assigned to handle the message; any messages, posts or queries from the customer service agent to other company staff, and any responses from the other company staff. Thus, whenever any company employee accesses the user interface 500 of the similar message system 2813 and accesses the corresponding message, that employee can see the complete chronological history of all internal actions that have been taken by other employees with regards to this message. The message activity area 503 may also show any communications with the external customer that posted the message.

The bottom of the message activity area 503 may include a message composing area 504 for a message author (e.g., customer service agent) to draft a message to respond to the customer that sent the message. The message may be sent directly to the customer, or posted as a publically viewable comment in response to the customer's original message posting on the respective social media platform.

For example, in one embodiment the similar message system 2813 may access an application programming interface that is provided by the social media system 22 to retrieve the social media identity information that includes the identity of the user as registered on the social network system 22, based on a message identifier or some other identification information obtained from a text analysis of the message. Thereafter, the similar message system 2813 may transmit a message based on the identification information of the user, via the API of the social media system 22. If the original message is a public posting on the social media system 22, the similar message system 2813 may access application programming interfaces that are exposed by the respective social medial systems 22 to post as a publically viewable comment in response to the customer's original message posting.

A solution finder area 505 may include different types of information. For example, as illustrated in FIG. 5, the upper left area of the solution finder area 505 may include a pull-down selection box 505a with a pull-down selector in the top that may be used to select various possible contextualized solutions to resolve the problem described in the social media message 503a that is current. Specifically, the pull-down selection box 505a is illustrated in FIG. 5 with a "Similar Message" option that has been selected from the pull-down selector. The selection of this similar message option causes the similar message system 2813 to generate and display a similar message recommendation list 506 that includes similar messages which have been determined by the similar message system 2813 to be similar and/or relevant to the current message 503a. The list 506 may further include a most recent response generated by a customer service agent in response to each of the similar messages in the list 506. Such recent responses may be extremely helpful to the agent in resolving the current message.

FIG. 6 illustrates exemplary portions of the similar message recommendation list 506. For example, the similar message recommendation list 506 may correspond to a table view 601, which includes the title of the similar message, a product identified in the message, a current status of the message (e.g., date closed, close by user X, etc.), etc. On the other hand, the similar message recommendation list 506 may correspond to a chunk view 602 that includes a message id, the contents of the message itself (or a portion thereof), a message thumbnail (e.g., icon of the user that posted the message), a customer service response message (or a portion thereof) associated with the message, an agent identity, a date closed, etc.

The similar messages may be automatically identified based on a combination of factors. For example, the similar message system 2813 may identify a social media message as similar responsive to identifying the message as being related to the same customer as listed in the customer identification area 301. Further, the similar message system 2813 may identify a social media message as similar responsive to identifying a message as being related to the same product listed in the product identification area 302 and or being associated with tags or tagged keywords that are associated with the current message. With respect to tags, the similar message system 2813 may automatically perform a text analysis (e.g., using the text analysis system 2820) of the current message 503a to detect certain keywords in the social media message that is current and tag the current message with those keywords. (e.g., tags) thereby enabling an identification and display of similar messages that are associated with the same tags.

Figure 7:
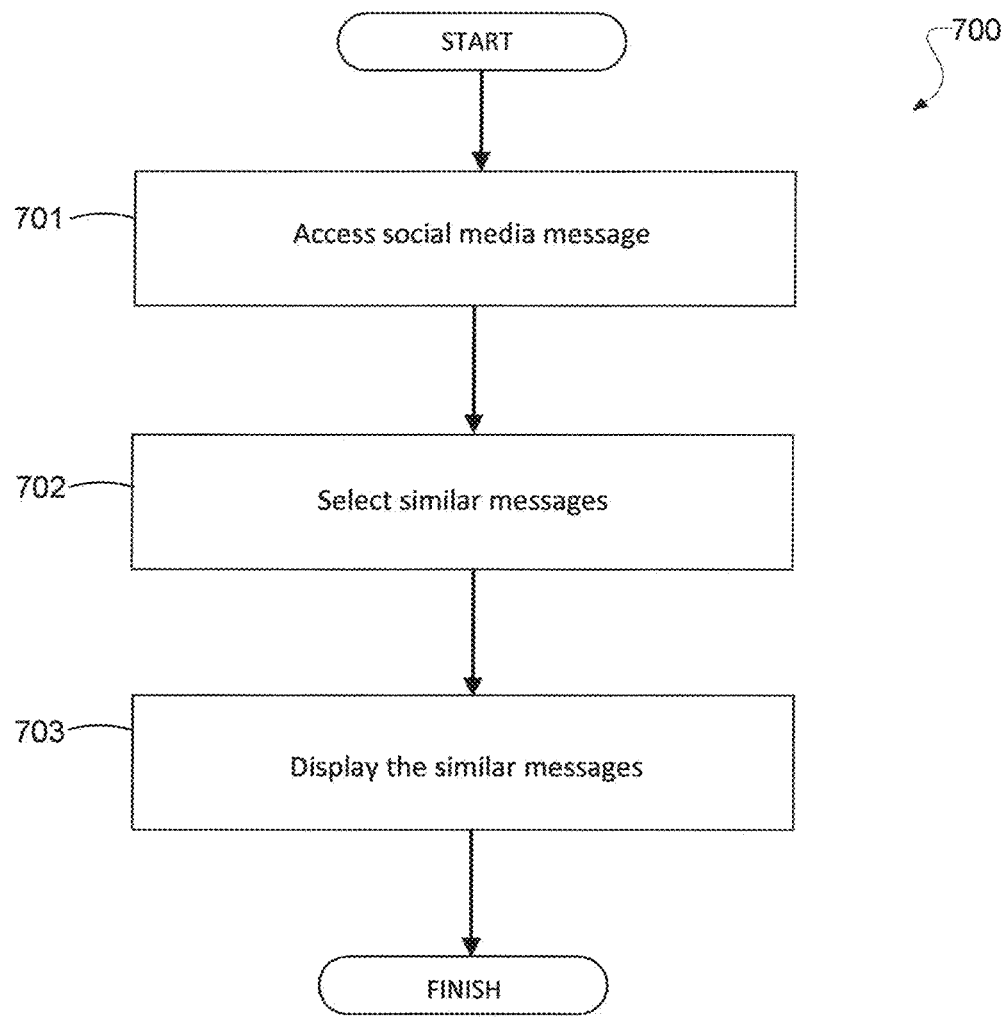
FIG. 7 is a flowchart illustrating an example method, according to various embodiments.

FIG. 7 is a flowchart illustrating an example method 700, according to various embodiments. The method 700 may be performed at least in part by, for example, the similar message system 2813 illustrated in FIG. 3 (or an apparatus having similar modules). In 701, the communication module 2819 may accesses a social media message posted on a social networking platform. Further, in 701 the customer identification system 2812 may identify the author of the social media message, using various methods describe above in this disclosure. In 702, the similar message system 2813 may select, from a database of previously posted messages, one or more similar social media messages that are determined to be similar to the social media message that was previously accessed. For example, the one or more similar social media messages that are similar may be selected based on a match between the author of the social media message that was accessed and an author of the one or more similar social media messages. As another example, the similar social media messages may be selected based on a match between the product or service identified in the social media message and a product or service identified in the similar social media messages. As another example, the similar social media message may be selected based on a match between the problem identified in the social media message and a problem identified in the similar social media messages. As yet another example, the similar message may be selected based on a match between a tagged keyword identified in the social media message and a tagged keyword identified in the similar social media messages. In 703, the similar message system 2813 displays the similar social media messages in a similar message recommendation list of a user interface (e.g., see similar message recommendation list 506 in FIG. 5). The similar messages list may also include previous customer service response messages associated with each of the similar social media messages.

As illustrated in FIG. 5 the top of the solution finder area 505 below the pull-down selection box is shown to illustrate various keywords/tags (e.g., "autooptimizer," "zos" and "60D"), that are identified in the current message 503*a* by the similar message system 2813, and that are presently being used by the similar message system 2813 as search keywords to identify the similar messages. That is, the similar message system 2813 identifies various keywords/tags in the current social media message 503*a*, and then searches previously received social media messages in a message history database or customer service message database (e.g., customer information 3001 and/or message information 3006 in FIG. 4) based on the aforementioned search keywords/tags. The results of this search are populated in the similar message recommendation list 506, and the tagged keywords used to generate the list 506 are also displayed. The user can remove one or more of these search keywords by selecting the "−" user interface element to the right of the keywords/tags, or add other keywords/tags by selecting the "+" user interface element to the right of the keywords/tags. Responsive to any of the above described actions a search of previous messages may be performed by the similar message system 2813 based on the new keywords/tags and the similar message recommendation list 506 updated accordingly. The solution finder area 505 at the top right also includes a search window to enter keywords to filter the similar messages that are already populated in the similar message recommendation list 506.

Figure 8:
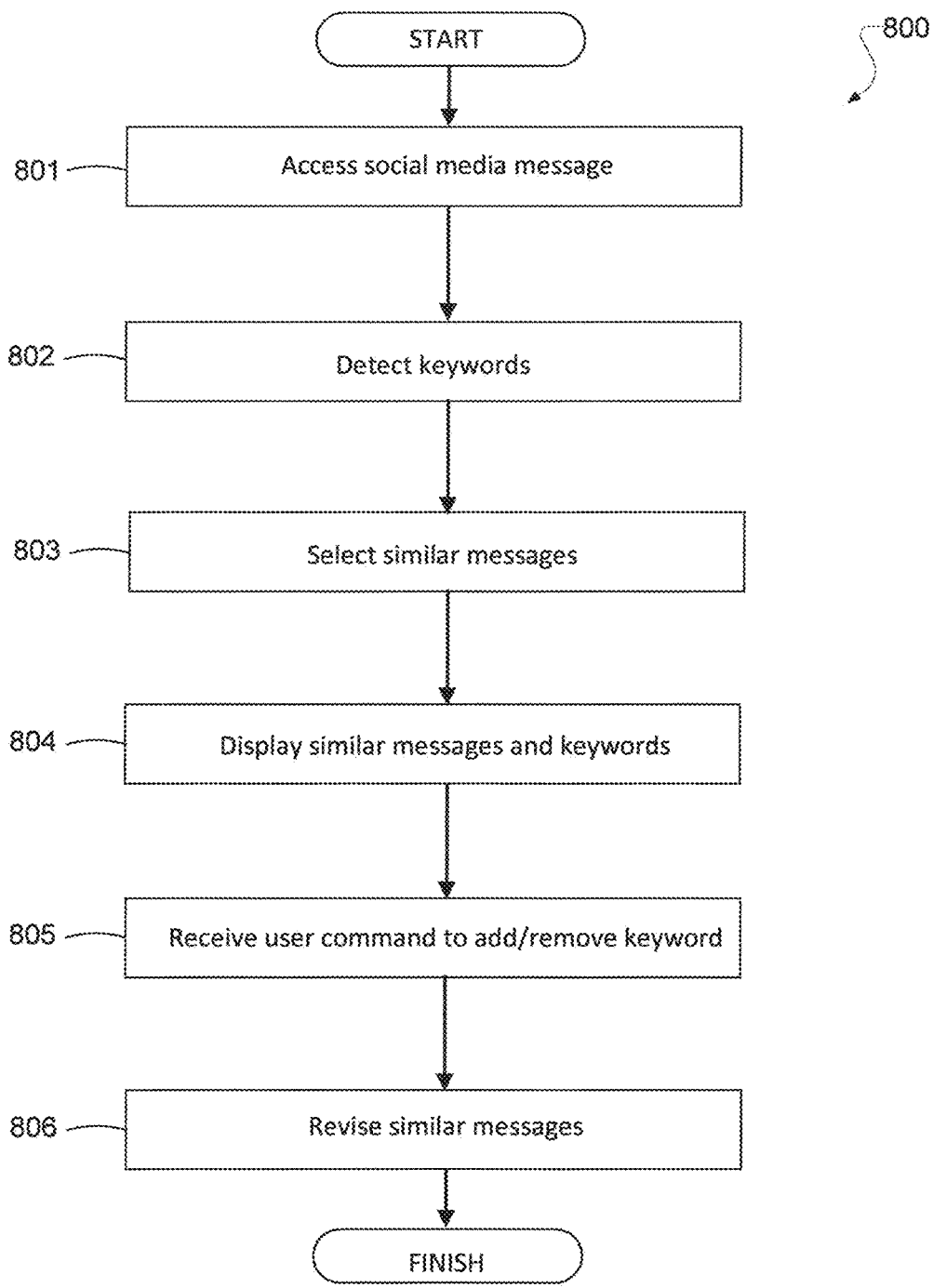
FIG. 8 is a flowchart illustrating an example method, according to various embodiments.

FIG. 8 is a flowchart illustrating an example method 800, according to various embodiments. The method 800 may be performed at least in part by, for example, the similar message system 2813 illustrated in FIG. 3 (or an apparatus having similar modules). In 801, the communication module 2819 may access a social media message posted on a social media system 22. In 802, the similar message system 2813 may detect one or more keywords in the social media message. In 803, the similar message system 2813 may select, from a database of previously posted messages, one or more similar messages determined to be similar to the social media message. For example, a particular previously posted message may be selected based on detecting at least some of the keywords (detected in the social media message in 802) in the particular previously posted message. In 804, the similar message system 2813 may display the similar messages in a similar message recommendation list of a user interface (e.g., see similar message recommendation list 506 in FIG. 5) and displays the keywords (utilized to select the similar messages in 803) in a keyword list. The similar messages list may also include previous customer service response messages associated with each of the similar messages. In 805, the similar message system 2813 may receive a user command to revise the keyword list. For example, the similar message system 2813 may receive a user command to remove one of the keywords in the keyword list, or a user command to add a keyword to the keyword list, to thereby generate a revised keyword list. In 806, the similar message system 2813 may revise the similar messages displayed in the similar message recommendation list, based on the revised keyword list. The revised keyword list itself may also be displayed.

As seen in FIG. 5, each similar message in the similar message recommendation list 506 may include a status, (e.g. closed, in process, etc.), an associated date and the customer service agent that is assigned to the similar message. Moreover, each entry in the similar message recommendation list 506 may also include the most recent response from a customer service agent to each particular customer message. When the user (e.g., agent) selects the "+" sign next to a similar message in the list 506, the corresponding customer service response may be automatically copied and pasted into the message composing area 504 of the current message activity area 503 as an editable draft response message to a current message 503*a*. Thus, customer service agents can efficiently build on from the previous work of other agents dealing with similar messages, while avoiding any duplication of work.

Figure 9:
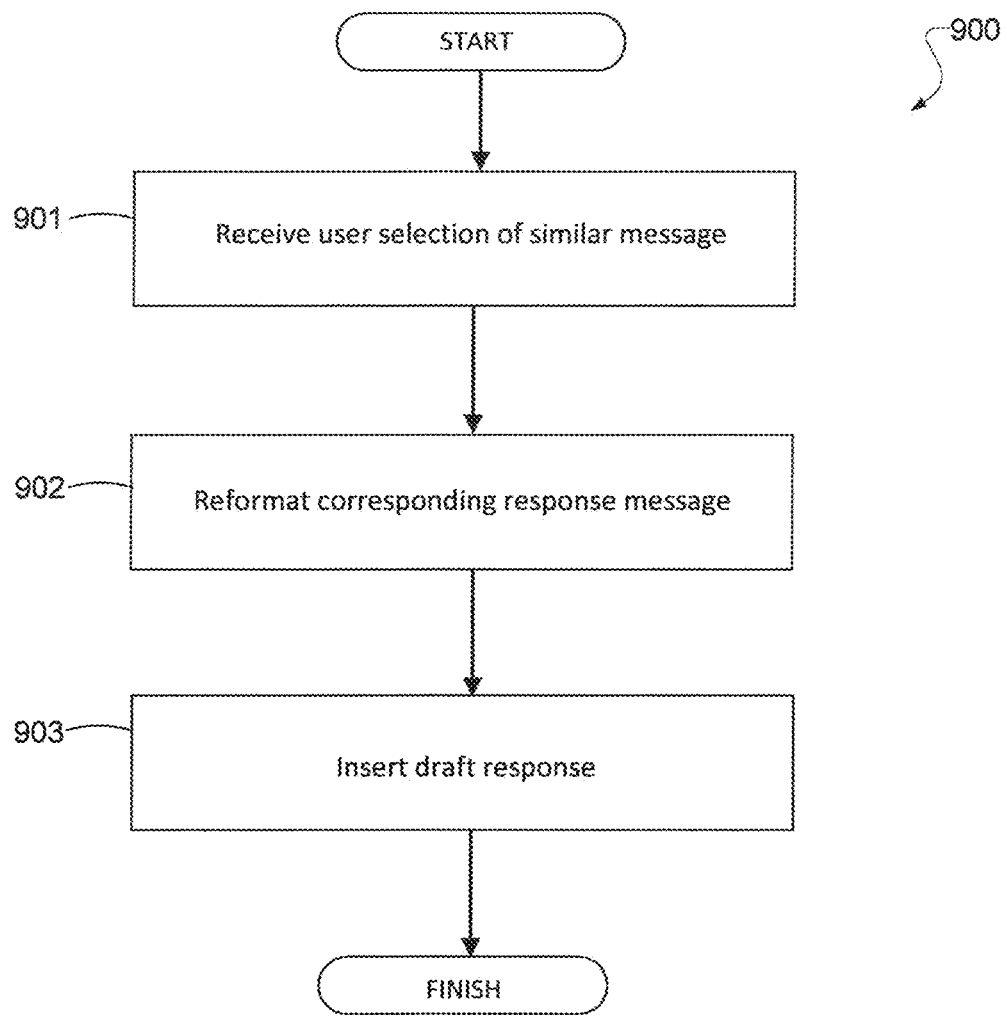
FIG. 9 is a flowchart illustrating an example method, according to various embodiments.

FIG. 9 is a flowchart illustrating an example method 900, according to various embodiments. The method 900 may be performed at least in part by, for example, the similar message system 2813 illustrated in FIG. 3 (or an apparatus having similar modules). The method 900 may be performed after, for example, 703 in FIG. 7 or 804 in FIG. 8, wherein the similar message recommendation list also includes previous customer service response messages associated with each of the similar messages. In 901, the similar message system 2813 may receive a user selection of a first one of the similar messages displayed in the similar message recommendation list. In 902, the similar message system 2813 may reformat the previous customer service response message corresponding to the first similar message as a draft response message addressed to the author of the social media message. In 903, the similar message system 2813 may insert the draft response message into a message composition window.

Figure 10:
FIG. 10 illustrates an example portion of a user interface, according to various embodiments.
Figure 11:
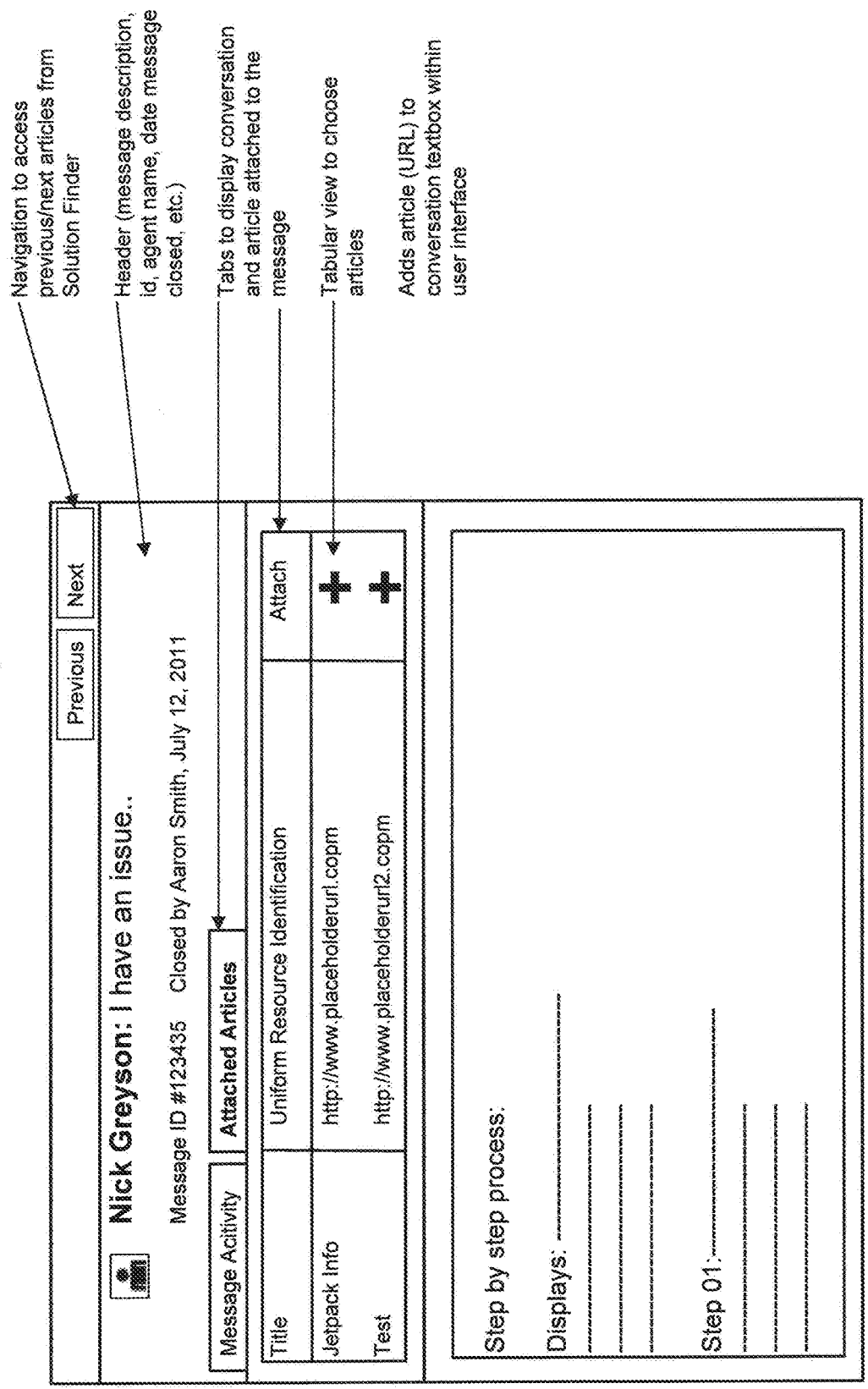
FIG. 11 illustrates an example portion of a user interface, according to various embodiments.

When the user selects any of the similar messages displayed in the similar message recommendation list 506, the similar message system 2813 may receive the selection and display a complete message activity (similar to the message activity displayed in the message activity area 503) with respect to the selected similar message. For example, after the user selects any of the similar messages displayed in the similar message recommendation list 506, the user interface 1000 of FIG. 10 may be displayed. The user interface 1000 may display a portion of the similar message, and includes a "message activity" tab that includes an interaction history of all communications back and forth between the user that posted that similar message, and the customer service representatives that responded to that user. If the user selects the "attached article" tab, than the user interface 1100 of FIG. 11 is displayed, where this user interface 1100 depicts any articles associated with that similar message or the customer service responses to that similar message.

When the user selects the paperclip icon next to a similar message in the list 506, the similar message system 2813 may receive the selection, and display user interface elements that may further be selected to retrieve attachments to the similar message. The attachments may include links, documents, articles, other forum posting related to the similar message, relevant community content, and so forth. Each similar message in the list may also include a community icon that may be selected to retrieve community content crawled from community forums.

The similar messages listed in the list 506 may be ranked and sorted for display based on their relevance (e.g. the extent to which there is a keyword match, customer match, product match, etc., with the current message 503*a* displayed in the message activity area 503). The customer agent may also select a "Like" user interface element corresponding to a similar message (and associated customer service response) in the list 506 to indicate that it is helpful in responding to the current message 503*a*, thereby moving the selected message (and any other similar messages with keywords matching the current liked message) to a higher position (e.g., towards the top) in the similar message recommendation list 506. On the other hand, the current agent may also select a "Dislike" user interface element for a similar message (and associated customer service response) in the similar message recommendation list 506 to indicate that it is not relevant or helpful in responding to the current message 503*a*, thereby moving the selected message (and any other similar messages with keywords matching the current disliked message) to a lower position (e.g., towards the bottom) in the similar message recommendation list or out of the list entirely. Such feedback may be stored and utilized the next time a new social media message with keywords similar to the current social media message 503 is received, in order to revise the ordering of the similar messages displayed in the similar messages list 506 in conjunction with the new social media message.

Figure 12:
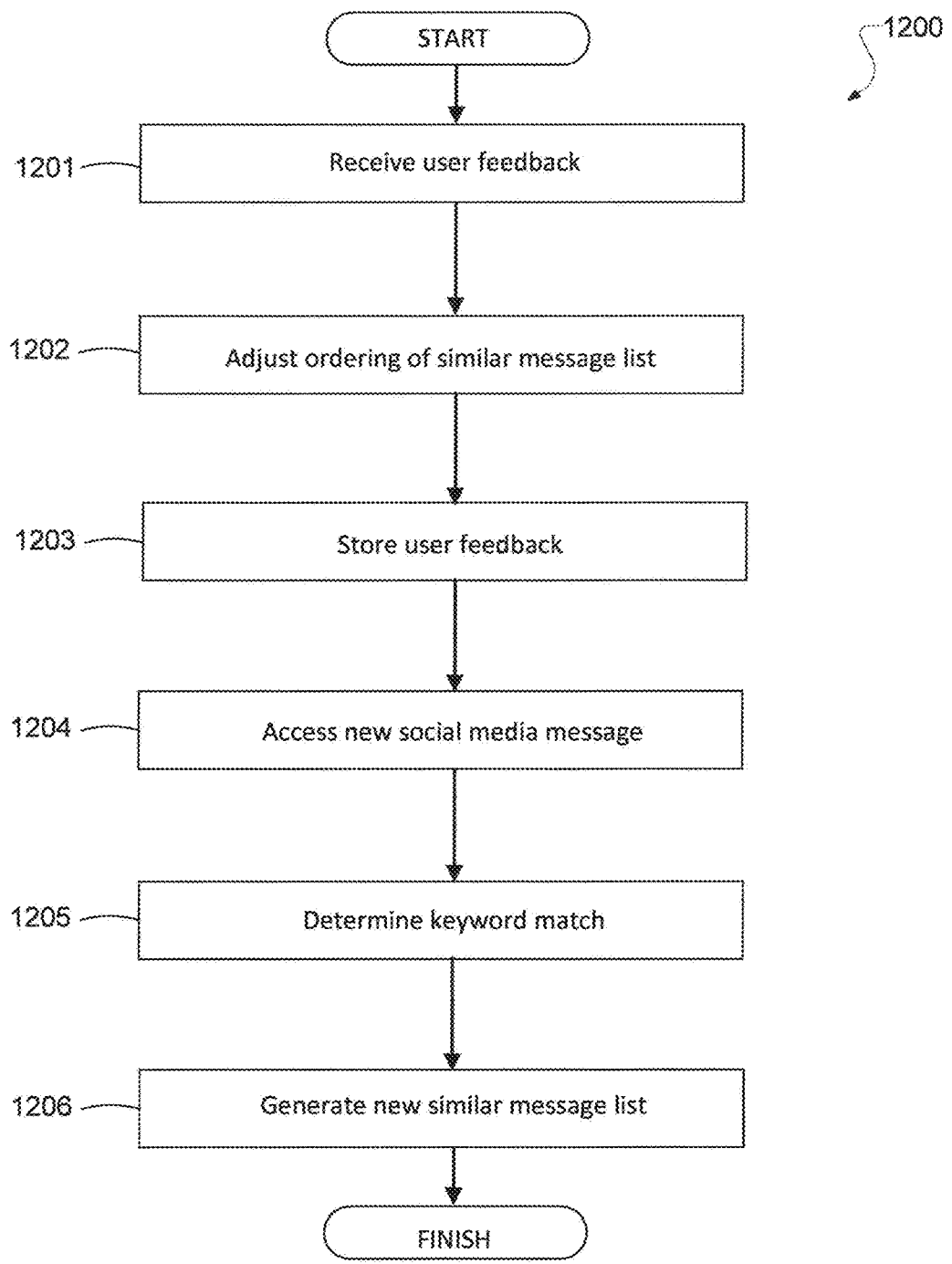
FIG. 12 is a flowchart illustrating an example method, according to various embodiments.

FIG. 12 is a flowchart illustrating an example method 1200, according to various embodiments. The method 1200 may be performed at least in part by, for example, the similar message system 2813 illustrated in FIG. 3 (or an apparatus having similar modules). The method 1200 may be performed after, for example, 703 in FIG. 7 or 804 in FIG. 8. In 1201, the similar message system 2813 may receive user feedback corresponding to one of the similar messages displayed in the similar message recommendation list, the user feedback corresponding to positive user feedback (e.g., the user clicking a "like" button or "thumbs up" button) or negative user feedback (e.g., the user clicking a "dislike" button or "thumbs down" button). In 1202, the similar message system 2813 may adjust the ordering of the similar messages list, based on the user feedback received in 1201. For example, if the user indicates that a particular similar message is helpful, that message may be moved towards the top of the similar message recommendation list, whereas if the user indicates that a particular similar message is not helpful, that message may be moved towards the bottom of the similar message recommendation list or removed from the list entirely. In 1203, the similar message system 2813 may store the user feedback received in 1201. In 1204, the similar message system 2813 may access a new social media message posted on the social networking platform. In 1205, the similar message system 2813 may determine that the new social media message contains keywords matching the keywords of the social media message (e.g., accessed in 701 in FIG. 7 or 801 in FIG. 8). In 1206, the similar message system 2813 may generate a new similar message recommendation list corresponding to the new social media message accessed in 1204, based at least in part on the user feedback stored in 1203.

Thus, if a first message is received with the keywords "broken lens" and a first set of similar messages (and corresponding customer service responses) are displayed, the user may look through the similar messages and provide feedback on which messages and customer service responses are helpful, and which messages and customer service responses are not helpful. Thereafter, the next time a social media message with the keyword "broken lens" is received, the similar message system 2813 accesses the previous user feedback and may ensure that the similar messages that were previously found helpful are included in the similar message recommendation list, while the previous messages that were not found helpful are not included in the similar message recommendation list.

The above described aspects and/or functions of the similar message system 2813, according to an embodiment, may be implemented and/or performed by the similar message module 2813*a* (see FIG. 3), which may correspond to a hardware module or a software module executed by one or more processors.

2: Recommended Knowledge Base

While handling customer issues, customer service agents typically spend a great deal of time identifying the product that is of concern to the customer, and determining the appropriate solution. In particular, the process of determining the appropriate solution generally involves finding relevant information in manuals, documents or literature regarding the user's product, where such information may be stored at disparate locations. Thus, the customer service agent may be forced to search and use multiple systems including one or more knowledgebases of information regarding products, manuals and paper documents. In fact, issues are more often escalated to product experts/expert agents due to lack of product knowledge on the level of junior agents.

According to an exemplary embodiment, the recommended knowledgebase system 2814 may provide access to knowledgebase systems and search engines that are maintained by the company, as well as knowledgebase systems and search engines that are provided by third party vendors.

For example, the recommended knowledgebase system 2814 may request the text analysis system 2820 to perform a text analysis of the content (e.g. words) of the current message (e.g., assigned message), to identify a particular product and/or issue (e.g., problem) that is referenced by the message. For example, the recommended knowledgebase system 2814 may include an internal list or knowledgebase of keywords describing known products such as "TV", "processor", "camera 600D" and so forth (e.g., product information 3003 in FIG. 4) that may be utilized in the text analysis to identify a particular product that is described in the current message. Similarly, the recommended knowledgebase system 2814 may include a list or knowledgebase of keywords describing known issue/problem classification such as "broken", "fix", "troubleshooting" and so forth that may be utilized in the text analysis to identify a problem/issue of a malfunctioning product that is described in the current message (e.g., assigned message).

After the recommended knowledgebase system 2814 identifies the product and problem/issue based on the text analysis and keyword identification process described above, the recommended knowledgebase system 2814 may provide a recommendation of knowledge base articles to the agent based on the identified product and problem/issue. The agent may, in turn, include a link to one or more of the identified articles in a response that is communicated to the customer, thereby enabling the customer to retrieve the recommended knowledge base article(s).

Figure 13:
FIG. 13 illustrates an example portion of a user interface, according to various embodiments.

FIG. 13 illustrates a user interface 1300 of the recommended knowledgebase system 2814, according to an embodiment. The user interface 1300 of FIG. 13 is similar to the user interface 500 of FIG. 5, and includes the previously described customer identification area 1301 (similar to 501), product identification area 1302 (similar to 502), message activity area 1303 (similar to 503), solution finder area 1305 (similar to 505), etc., as described at callouts 501-505 in FIG. 5 described above.

The solution finder area 1305 may include a pull-down selection box 1305*a* with a pull-down selector to select either a "Similar Messages" mode, as described above, or a "KB Articles" mode (e.g., knowledgebase articles) of an exemplary embodiment, as illustrated in FIG. 13. That is, responsive to the user (e.g. agent) selecting the knowledgebase mode in the solution finder 1305, the recommended knowledgebase system 2814 may generate and display a list 1306 of recommended knowledgebase articles that are selected based on their relevancy to the product and issue/problems as described in the current message 1303*a*. Such knowledgebase articles may be retrieved from knowledgebases (e.g. knowledgebase repository 3004 illustrated in FIG. 4) and/or search engines that are provided by the company and third party vendors.

Figure 14:
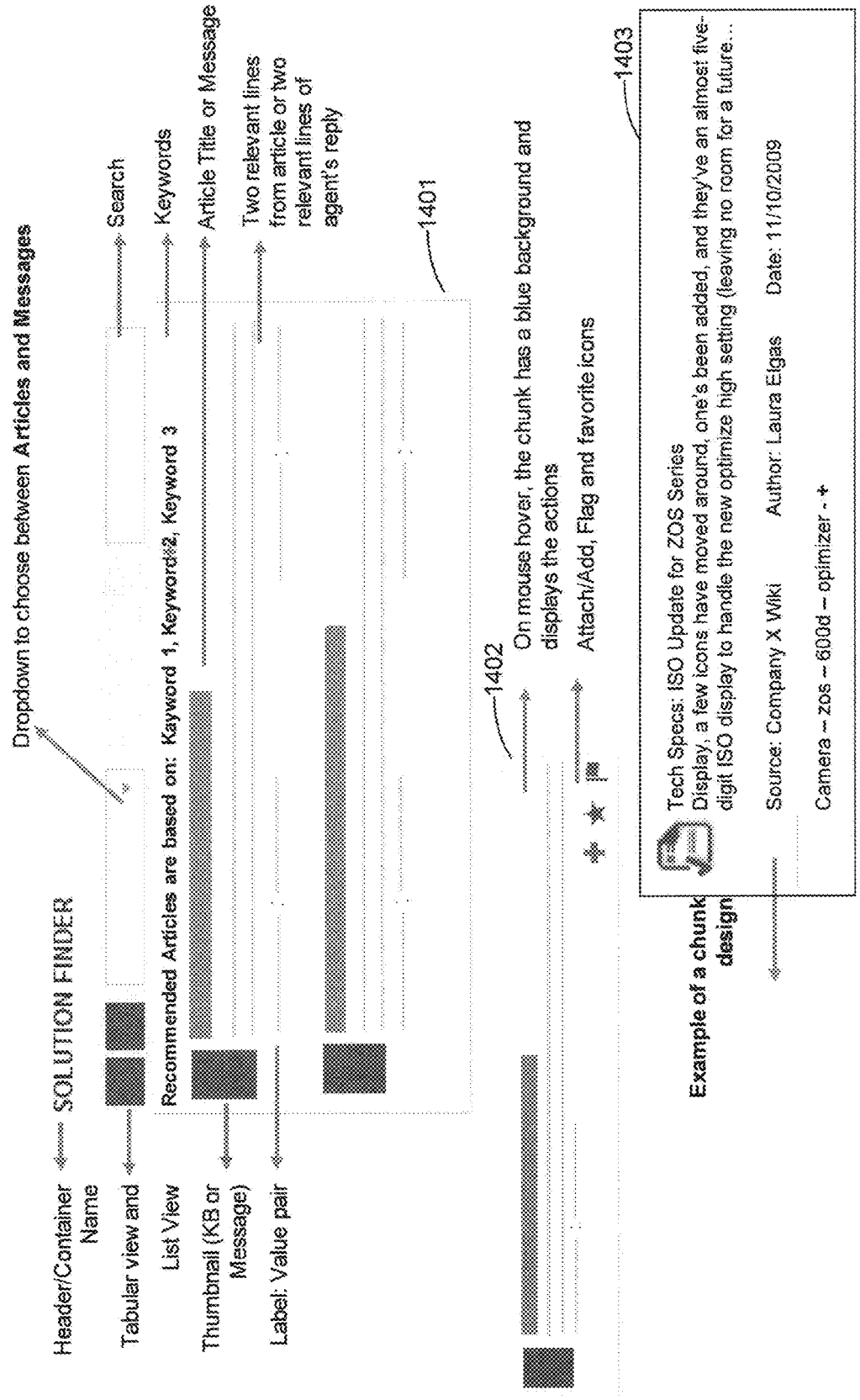
FIG. 14 illustrates example portions of a user interface, according to various embodiments.

FIG. 14 illustrates various exemplary portions of the solution finder area 1305. For example, user interface 1401 illustrates the solution finder area 1305 in more detail, and illustrates the drop-down selection box (to switch between similar message view and knowledgebase article view), a list of keywords, a search box for entering search criteria to search the knowledgebase articles in the knowledgebase article list, and an entry for each knowledgebase article (including title, relevant lines, thumbnail, associated keywords/value pairs, source, author, and date). An example of an entry for a knowledgebase article in the knowledgebase article list is illustrated in 1403. If the user moves a mouse over one of the entries in the knowledgebase article list, the entry may change color or become obscure, and other options may be presented (e.g., attach/add link to draft response message, flag, favorites/like, etc.) as illustrated in 1402.

The knowledgebase articles may be automatically identified based on multiple factors. For example, the recommended knowledgebase system 2814 may identify and display knowledgebase articles related to the same customer as listed in the customer identification area 1301, and/or identify and display knowledgebase articles related to the same product listed in the product identification area 1302 and/or identify and display knowledgebase articles that are associated with the same tags that are associated with the current message 1303*a*. With respect to the tags, the recommended knowledgebase system 2814 may automatically instruct the text analysis system 2820 to perform a text analysis of the current message 1303*a* in order to detect certain keywords in the message and tag the message with those keywords (e.g., tags), thereby enabling an identification and display of knowledgebase articles that are associated with the same tags. For example, the recommended knowledgebase system 2814 may search for knowledgebase articles that include the same keywords or are tagged with the same keywords (e.g. from the company's knowledgebase system, such as knowledgebase repository 3004 illustrated in FIG. 4, as well as third party knowledgebase systems and search engines). A list of the knowledge base articles found by the recommended knowledgebase system 2814 (or portions thereof, such as a title, abstract, relevant quote, etc.) may be displayed in a knowledge base list 1306. The knowledge base articles may include documentation, product manuals, product specifications, FAQs, troubleshooting guides, and so on.

FIG. 15 illustrates a user interface 1500 displayed by the recommended knowledgebase system 2814 according to an embodiment. The user interface 1500 may include a knowledgebase article list area 1501 that further includes a knowledgebase list 1306. The knowledgebase list 1306 may be displayed in a "table view" or a "chunk view". The knowledgebase list 1306 is illustrated in FIG. 15 in table view, where each entry includes a topic name or title of the article, a source of the article, a date of the article, and an action (e.g., "+" to attach the article or add a link to the article into a draft response message).

FIG. 16 illustrates a user interface 1600 according to an embodiment. The user interface 1600 further illustrates the table view of the knowledgebase list 1306 in more detail.

Figure 17:
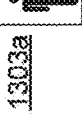
FIG. 17 illustrates an example portion of a user interface, according to various embodiments.

FIG. 17 illustrates a user interface 1700, according to an embodiment. The user interface 1700 includes a knowledgebase article list 1701 that is displayed in chunk view. Each entry of the knowledgebase article list is illustrated as including an article title, relevant lines from the article, thumbnail view of the article, associated keywords/value pairs, source, author and date.

Figure 18:
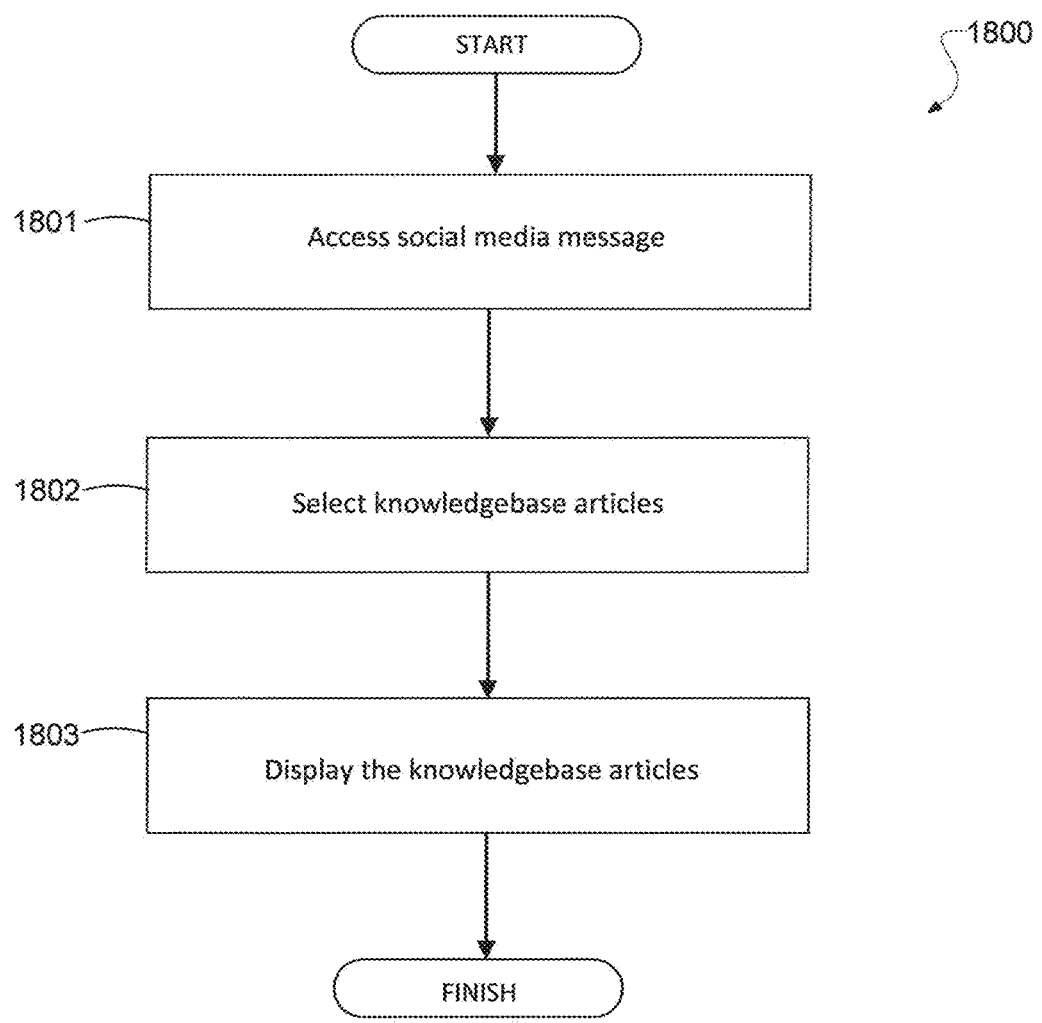
FIG. 18 is a flowchart illustrating an example method, according to various embodiments.

FIG. 18 is a flowchart illustrating an example method 1800, according to various embodiments. The method 1800 may be performed at least in part by, for example, the recommended knowledgebase system 2814 illustrated in FIG. 3 (or an apparatus having similar modules). In 1801, the communication module 2819 may access a social media message posted on a social networking platform. In 1802, the recommended knowledgebase system 2814 may select, from a knowledgebase repository, one or more relevant knowledgebase articles determined to be similar to the social media message. For example, the relevant knowledgebase article may be selected based on a match between the product or service identified in the social media message and a product or service identified in the relevant knowledgebase article. As another example, the relevant knowledgebase article may be selected based on a match between the problem identified in the social media message and a problem identified in the relevant knowledgebase article. As yet another example, the relevant knowledgebase article may be selected based on a match between a tagged keyword identified in the social media message and a tagged keyword identified in the relevant knowledgebase article. In 1803, the recommended knowledgebase system 2814 may display the relevant knowledgebase articles (or a portion thereof, such as a title, abstract, relevant quote, etc.) in a knowledgebase article list of a user interface (e.g., see knowledgebase article list 1306 in FIG. 13).

As illustrated in FIG. 13, at an upper portion of the solution finder area 1305, various keywords/tags (e.g., "autooptimizer," "zos" and "60D") identified in the current message 1303*a* are presently being used as search keywords to identify knowledgebase articles. That is, the recommended knowledgebase system 2814 may identify various keywords/tags in the current social media message 1303*a*, and then search for knowledgebase articles (e.g. in the company's knowledgebase system, as well as third party knowledgebase systems and search engines), based on the aforementioned search keywords/tags. The results of this search may be populated in an knowledgebase article list 1306 and displayed in a user interface, as described above. Further, tagged keywords that are used to generate the list 1306 may also be displayed. The user may remove one or more of these search keywords/tags by selecting the "−" user interface element to the right of the keywords/tags, or add other keywords/tags by selecting the "+" user interface element to the right of the keywords/tags. Responsive to any of the above described actions a search may be performed based on the new set of keyword/tags and the knowledgebase article list 1306 is updated accordingly. The solution finder area 1305 at the top right also includes a search window to enter keywords to filter the knowledgebase articles already populated in the knowledgebase articles list 1306.

Figure 19:
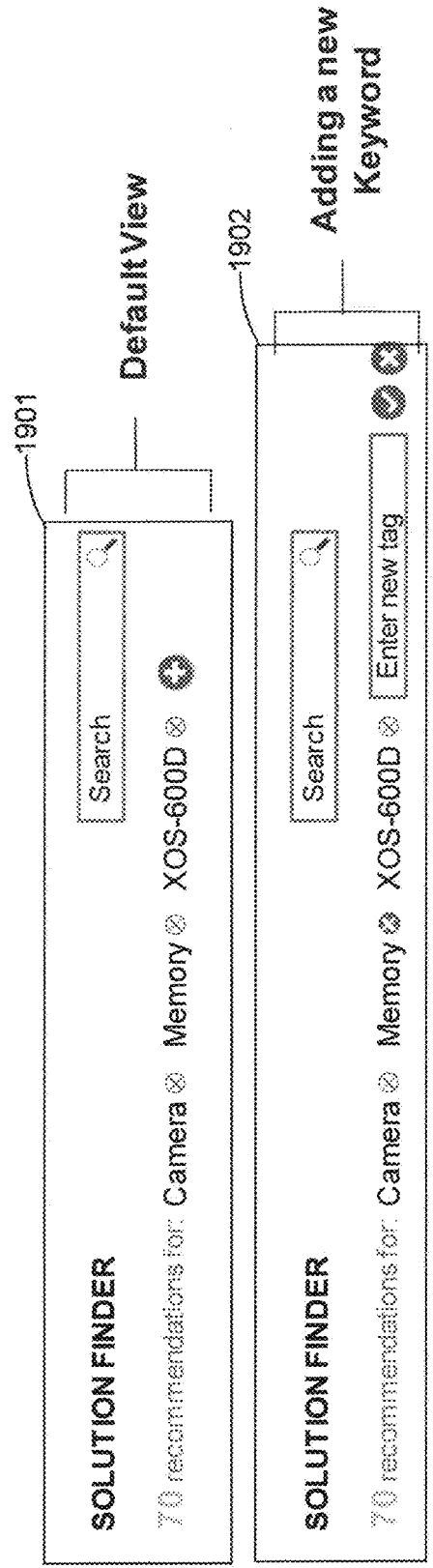
FIG. 19 illustrates example portions of a user interface, according to various embodiments.

FIG. 19 is a block diagram illustrating a default view 1901 and a keyword addition view 1902, according to an embodiment. The default view 1901 or the keyword addition view 1902 may appear in the upper portions of the solution finder area 1305. The default view 1901 illustrates keywords in the keyword list, and a "+" icon that may be selected to display the keyword addition view 1902 in place of the default view 1901 to add a keyword. For example, when the user clicks on the "+" icon in default view 1901, the solution finder area 1305 may change to the keyword addition view 1902 to enable an addition of a new tag/keyword to the keyword list.

Figure 20:
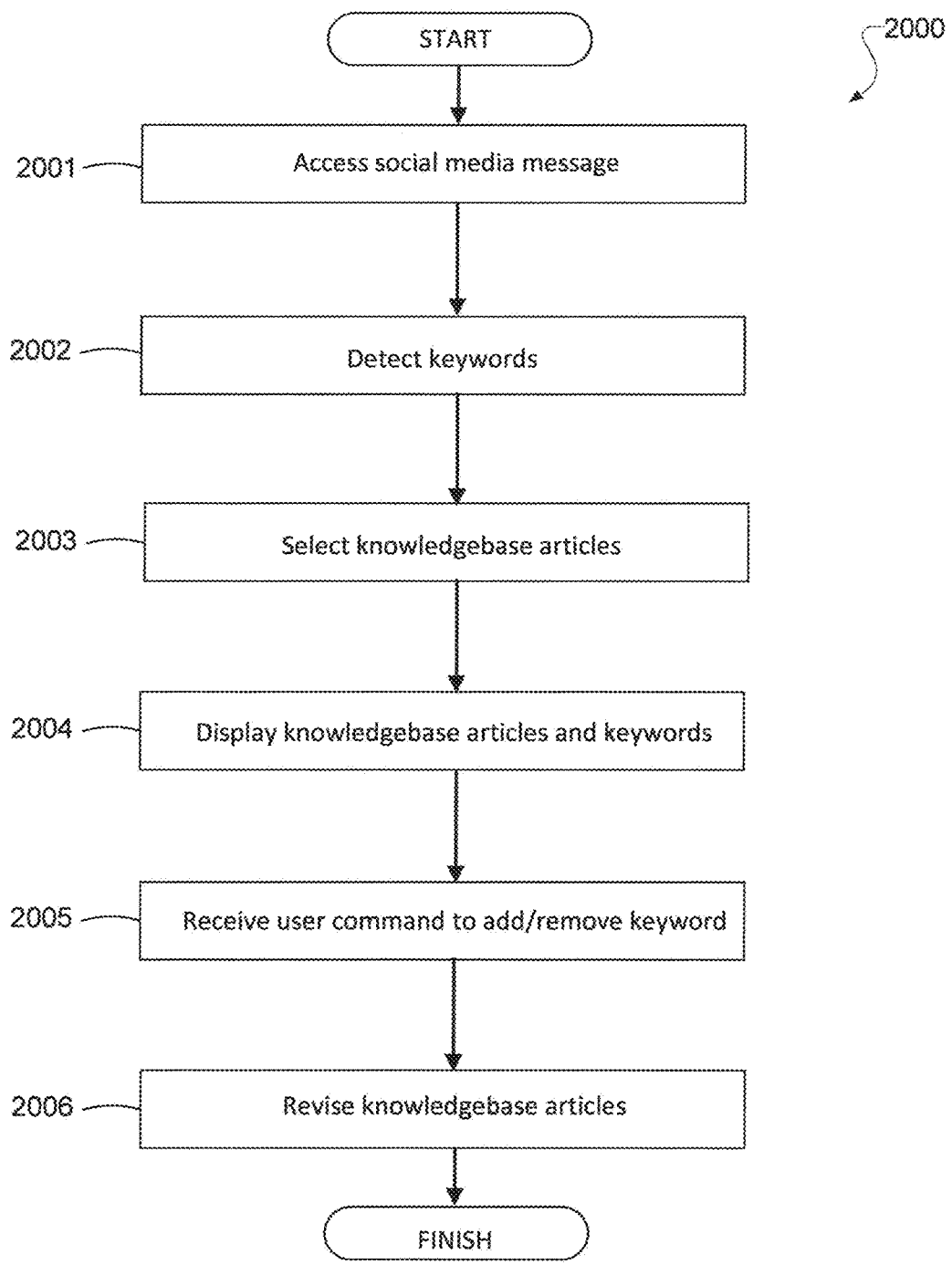
FIG. 20 is a flowchart illustrating an example method, according to various embodiments.

FIG. 20 is a flowchart illustrating an example method 2000, according to various embodiments. The method 2000 may be performed at least in part by, for example, the recommended knowledgebase system 2814 illustrated in FIG. 3 (or an apparatus having similar modules). In 2001, the communication module 2819 may access a social media message posted on a social networking platform. In 2002, the recommended knowledgebase system 2814 may detect or identify one or more keywords in the social media message. In 2003, the recommended knowledgebase system 2814 may select, from knowledgebase repository, one or more relevant knowledgebase articles determined to be relevant to the social media message. For example, a particular knowledgebase article may be selected based on detecting at least some of the keywords (detected in the social media message in 2002) in the particular knowledgebase article. In 2004, the recommended knowledgebase system 2814 may display the relevant knowledgebase articles in a knowledgebase article list of a user interface (e.g., see knowledgebase article list 1306 in FIG. 13) and the keywords (utilized to select the relevant knowledgebase articles in 2003) in a keyword list. In 2005, the recommended knowledgebase system 2814 may receive a user command to revise the keyword list. For example, the recommended knowledgebase system 2814 may receive a user command to remove one of the keywords in the keyword list, or a user command to add a keyword to the keyword list, to thereby generate a revised keyword list. In 2006, the recommended knowledgebase system 2814 may revise the relevant knowledgebase articles displayed in the knowledgebase article list, based on the revised keyword list. The revised keyword list itself may also be displayed.

Figure 21:
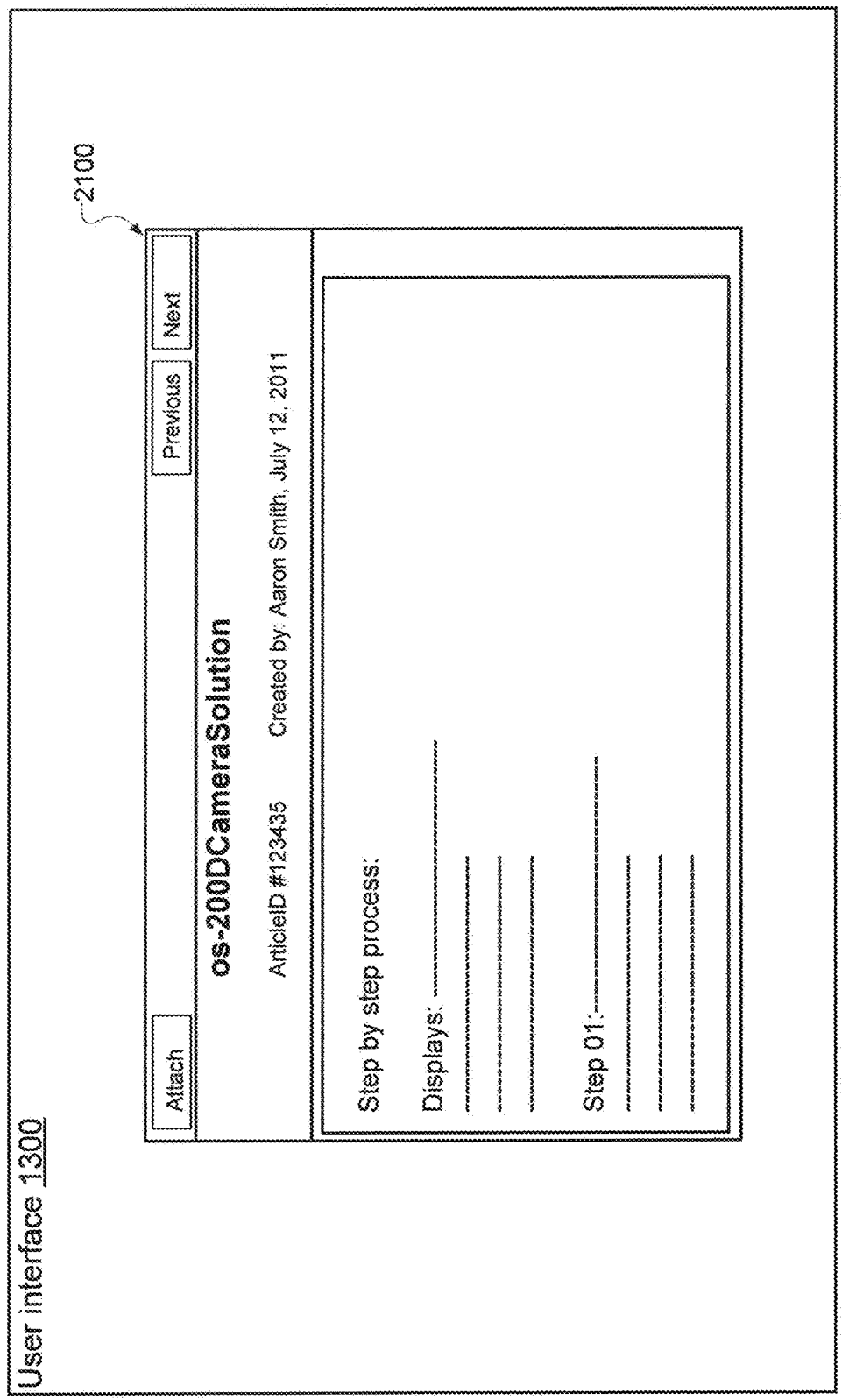
FIG. 21 illustrates an example portion of a user interface, according to various embodiments.
Figure 22:
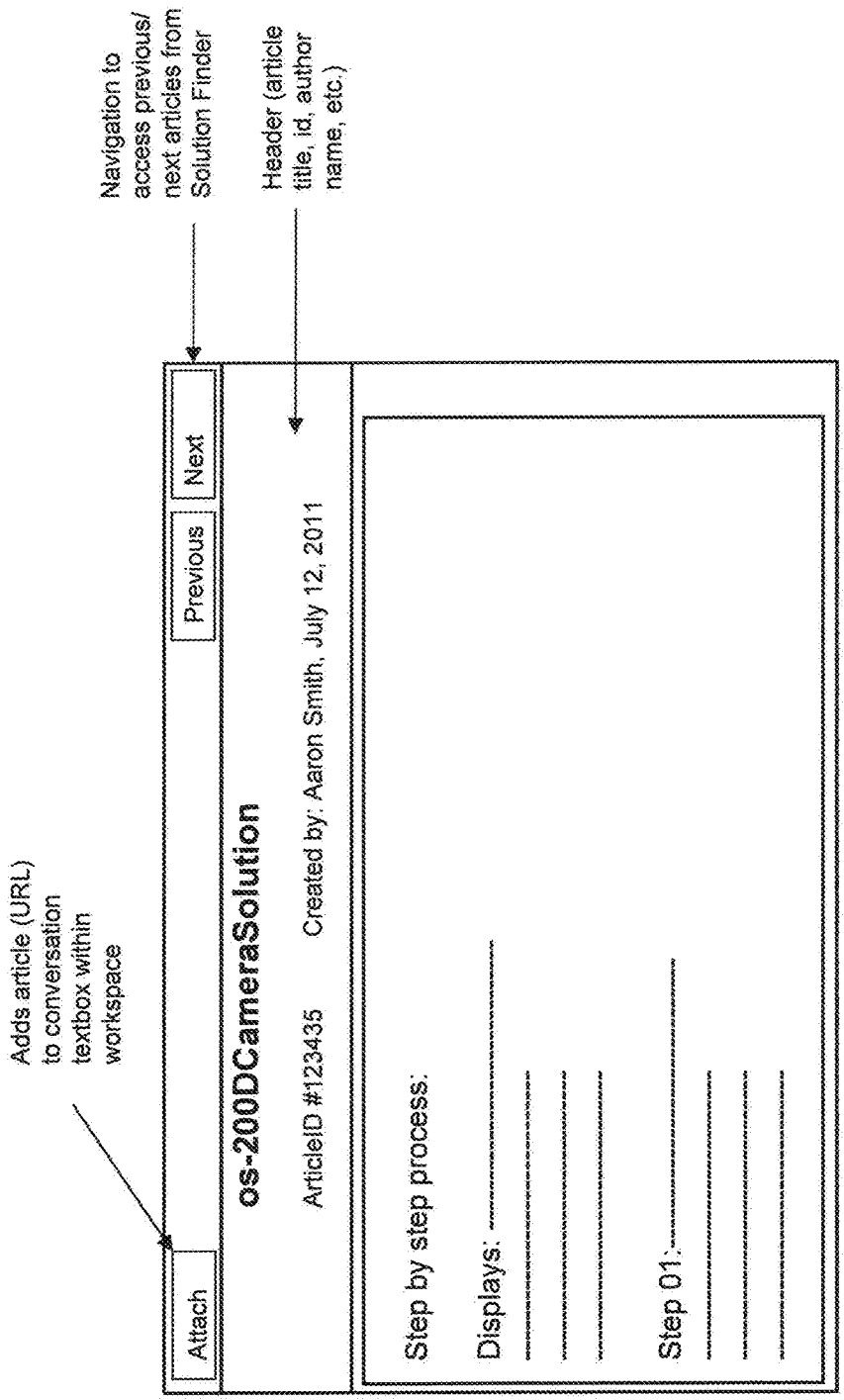
FIG. 22 illustrates an example portion of a user interface, according to various embodiments.

As seen in FIGS. 13, 14, and 17, each entry in the knowledgebase article list 1306 includes an abstract or relevant quote (e.g, a quote including the relevant keywords discussed above) of the knowledgebase article, as well as a most recent modification date and the name of the most recent modifier. When the user (e.g, agent) selects any of the knowledgebase articles that are displayed in the knowledgebase article list 1306, the user is able to see and browse the complete knowledgebase article, within a pane 2100 within the user interface 1300 of FIG. 13 (i.e. without being directed to an external website), as illustrated in the user interfaces of FIG. 21. FIG. 22 illustrates a more detailed view of the user interface pane displayed the selected knowledgebase article.

Referring back to FIG. 13, when the user selects the "+" sign next to a knowledgebase article identified in the knowledgebase article list 1306, a link to the knowledgebase article may be automatically copied and pasted into the message composing area 1304 of the current message activity window 1303 as a draft response message to the current message 1303a. Instead, or in addition, when the user selects the "+" sign next to a knowledgebase article identified in the knowledgebase article list 1306, the knowledgebase article may be automatically attached to a draft response message that is being composed in the message composing area 1304 of the current message activity window 1303.

Figure 23:
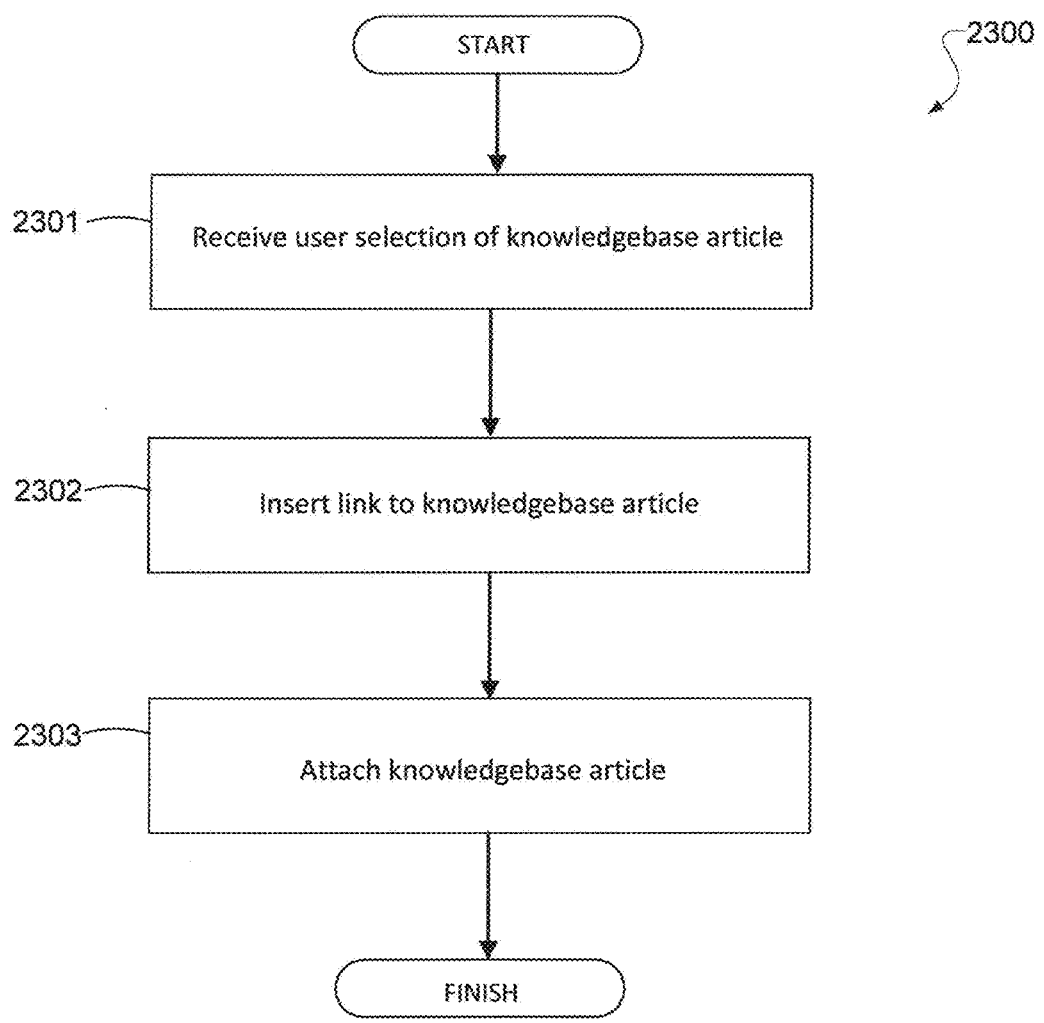
FIG. 23 is a flowchart illustrating an example method, according to various embodiments.

FIG. 23 is a flowchart illustrating an example method 2300, according to various embodiments. The method 2300 may be performed at least in part by, for example, the recommended knowledgebase system 2814 illustrated in FIG. 3 (or an apparatus having similar modules). The method 2300 may be performed after, for example, 1803 in FIG. 18 or 2004 in FIG. 20. In 2301, the recommended knowledgebase system 2814 may receive a user selection of a first one of the relevant knowledgebase articles displayed in the knowledgebase article list. In 2302, the recommended knowledgebase system 2814 may insert a link to the first relevant knowledgebase article selected in 2301 into a draft response message addressed to the author of the social media message (e.g., the original social media message accessed at 1801 in FIG. 18 or 2001 in FIG. 20). The draft response message may be displayed in a message composition window of a user interface. Instead of 2302, or in addition to 2302, in 2303, the recommended knowledgebase system 2814 may attach the first relevant knowledgebase article selected in 2301 to a draft response message addressed to the author of the social media message (e.g., the original social media message accessed at 1801 in FIG. 18 or 2001 in FIG. 20). The draft response message may be displayed in a message composition window.

Referring back to FIG. 13, the articles listed in the knowledgebase article list 1306 may be ranked and sorted for display based on their relevance (e.g. the extent to which there is a keyword match, customer match, product match, etc. with the current message 1303a displayed in the message activity area 1303). The current agent may also select a "like" user interface element for a knowledgebase article in the knowledgebase article list 1306, to indicate that it is helpful in responding to the current message 1303a, thereby moving the identified knowledgebase article (and any other similar knowledgebase articles with keywords matching the current liked knowledgebase article) to a higher position (e.g., towards the top) in the knowledgebase article list 1306. On the other hand, the current agent may also select a "dislike" user interface element for a knowledgebase article in the knowledgebase article list 1306, to indicate that it is not relevant or helpful in responding to the current message 1303a, thereby moving the selected knowledgebase article (and any other similar messages with keywords matching the current disliked knowledgebase article) to a position that is lower (e.g., towards the bottom) in the knowledgebase article list 1306 or out of the list entirely. Such feedback may be stored and utilized the next time a new social media message with keywords similar to the current social media message 1303a is received, in order to revise the ordering of the knowledgebase articles displayed in the knowledgebase article list 1306 in conjunction with the new social media message.

Figure 24:
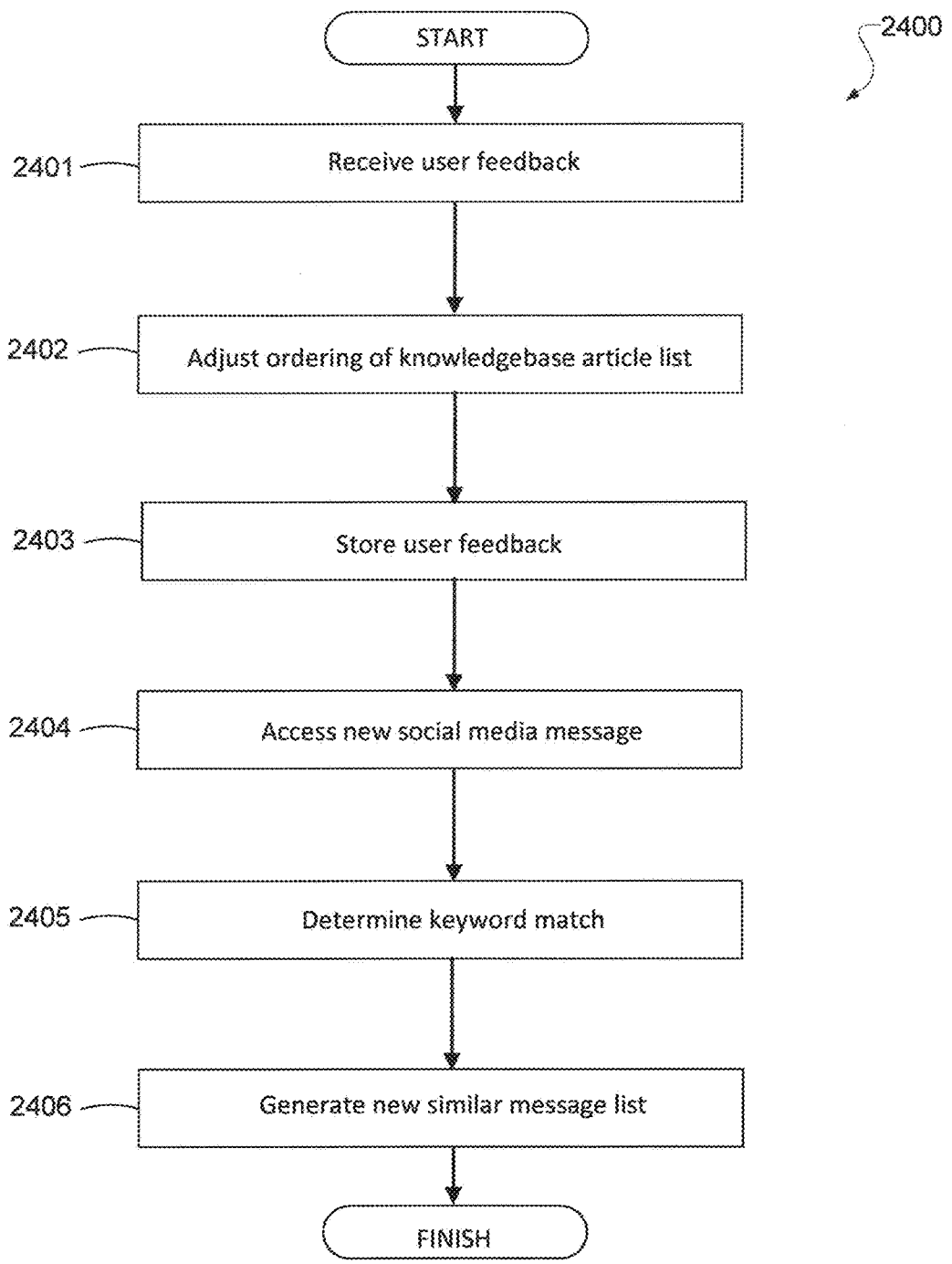
FIG. 24 is a flowchart illustrating an example method, according to various embodiments.

FIG. 24 is a flowchart illustrating an example method 2400, according to various embodiments. The method 2400 may be performed at least in part by, for example, the recommended knowledgebase system 2814 illustrated in FIG. 3 (or an apparatus having similar modules). The method 2400 may be performed after, for example, 1803 in FIG. 18 or 2004 in FIG. 20. In 2401, the recommended knowledgebase system 2814 may receive user feedback corresponding to one of the relevant knowledgebase articles displayed in the knowledgebase article list, the user feedback corresponding to positive user feedback (e.g., the user clicking a "like" button or "thumbs up" button) or negative user feedback (e.g., the user clicking a "dislike" button or "thumbs down" button). In 2402, the recommended knowledgebase system 2814 may adjust the ordering of the knowledgebase article list, based on the user feedback received in 2401. For example, if the user indicates that a particular knowledgebase article is helpful, that knowledgebase article may be moved towards the top of the knowledgebase article list, whereas if the user indicates that a particular knowledgebase article is not helpful, that knowledgebase article may be moved towards the bottom of the knowledgebase article list or removed from the list entirely. In 2403, the recommended knowledgebase system 2814 stores the user feedback received in 2401. In 2404, the recommended knowledgebase system 2814 may access a new social media message posted on the social networking platform. In 2405, the recommended knowledgebase system 2814 may determine that the new social media message contains keywords matching the keywords of the social media message (e.g., the original social media message accessed in 1801 in FIG. 18 or 2001 in FIG. 20). In 2406, the recommended knowledgebase system 2814 may generate a new knowledgebase article list corresponding to the new social media message accessed in 2404, based at least in part on the user feedback stored in 2403.

Thus, if a first message is received with the keywords "broken lens" and a first set of knowledgebase articles are displayed, the user may look through the knowledgebase articles and provide feedback on which knowledgebase articles are helpful, and which are not helpful. Thereafter, the next time a social media message with the keyword "broken lens" is received, the similar message system 2813 accesses the previous user feedback and may ensure that the knowledgebase articles that were previously found helpful are included in the knowledgebase article list, while the previous knowledgebase articles that were not found helpful are not included in the knowledgebase article list.

The above described aspects and/or functions of the recommended knowledgebase system 2814, according to an embodiment, may be implemented and/or performed by the recommended knowledgebase module 2814a (see FIG. 3), which may correspond to a hardware module or a software module executed by one or more processors.

Modules, Components and Logic

Certain embodiments are described herein as including logic or a number of components, modules, or mechanisms. Modules may constitute either software modules (e.g. code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 25:
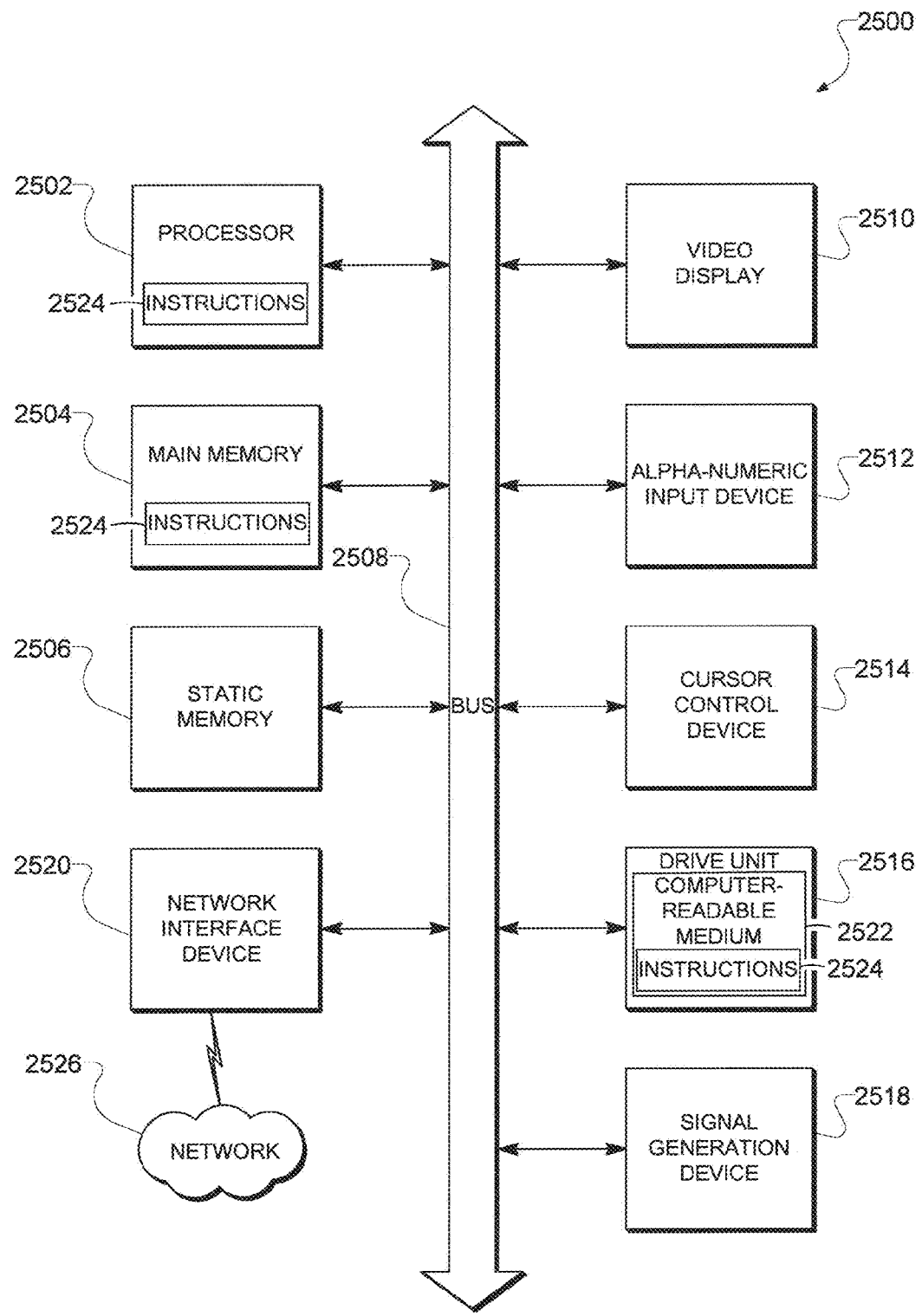
FIG. 25 is a diagrammatic representation of a machine in the example form of a computer system within which a set of instructions, for causing the machine to perform any one or more of the methodologies discussed herein, may be executed.

FIG. 25 is a block diagram of machine in the example form of a computer system 2500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU), a graphics processing unit (GPU) or both), a main memory 2504 and a static memory 2506, which communicate with each other via a bus 2508. The computer system 2500 may further include a video display unit 2510 (e.g., a liquid crystal display (LCD) or a cathode ray tube (CRT)). The computer system 2500 also includes an alphanumeric input device 2512 (e.g., a keyboard or a touch-sensitive display screen), a user interface (UI) navigation device 2514 (e.g., a mouse), a disk drive unit 2516, a signal generation device 2518 (e.g., a speaker) and a network interface device 2520.

Machine-Readable Medium

The disk drive unit 2516 includes a machine-readable medium 2522 on which is stored one or more sets of instructions and data structures (e.g., software) 2524 embodying or utilized by any one or more of the methodologies or functions described herein. The instructions 2524 may also reside, completely or at least partially, within the main memory 2504 and/or within the processor 2502 during execution thereof by the computer system 2500, the main memory 2504 and the processor 2502 also constituting machine-readable media.

While the machine-readable medium 2522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2524 may further be transmitted or received over a communications network 2526 using a transmission medium. The instructions 2524 may be transmitted using the network interface device 2520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   accessing a social media message posted on a social media system, the social media message describing a product;
   identifying a problem keyword in the social media message indicating a problem with the product, responsive to comparing text in the social media message to a list of known problem keywords;
   classifying, using one or more processors, one or more messages in a database of previously posted messages as one or more similar messages that are similar to the social media message, based on detecting the problem keyword identified in the social media message in the one or more similar messages;
   displaying the similar messages in a similar message recommendation list of a user interface, the similar message recommendation list including previous customer service response messages associated with each of the similar messages;
   receiving a user selection of a first one of the similar messages displayed in the similar message recommendation list; and
   reformatting the previous customer service response message corresponding to the first one of the similar messages as a draft response message addressed to an author of the social media message, and inserting the draft response message into a message composition window.

2. The method of claim 1, further comprising:
   detecting one or more keywords in the social media message, wherein the similar messages are selected based at least in part on a detection of the one or more keywords in the similar messages; and
   displaying the keywords in a keyword list.

3. The method of claim 2, further comprising:
   receiving a user command to remove one of the keywords in the keyword list or add a keyword to the keyword list to generate a revised keyword list; and
   revising the similar messages included in the similar message recommendation list, based on the revised keyword list.

4. The method of claim 1, further comprising:
   receiving user feedback corresponding to one of the similar messages displayed in the similar message recommendation list, the user feedback corresponding to positive user feedback or negative user feedback; and
   adjusting the ordering of the similar message recommendation list, based on the user feedback.

5. The method of claim 4, further comprising:
   storing the user feedback;
   accessing a new social media message posted on the social media system;
   determining that the new social media message contains keywords matching keywords of the social media message; and
   generating a new similar message recommendation list corresponding to the new social media message, based at least in part on the stored user feedback.

6. A system comprising:
   a communication module, comprising one or more processors, configured to access a social media message posted on a social media system, the social media message describing a product; and
   a similar message module, comprising the one or more processors, configured to:
      identify a problem keyword in the social media message indicating a problem with the product, responsive to comparing text in the social media message to a list of known problem keywords;
      classify one or more messages in a database of previously posted messages as one or more similar messages that are similar to the social media message, based on detecting the problem keyword identified in the social media message in the one or more similar messages;
      display the similar messages in a similar message recommendation list of a user interface, the similar message recommendation list including previous customer service response messages associated with each of the similar messages;
      receive a user selection of a first one of the similar messages displayed in the similar message recommendation list; and
      reformat the previous customer service response message corresponding to the first one of the similar messages as a draft response message addressed to an author of the social media message, and inserting the draft response message into a message composition window.

7. A non-transitory machine-readable storage medium having embodied thereon instructions executable by one or more machines to perform operations comprising:
   accessing a social media message posted on a social media system, the social media message describing a product;
   identifying a problem keyword in the social media message indicating a problem with the product, responsive to comparing text in the social media message to a list of known problem keywords;
   classifying one or more messages in a database of previously posted messages as one or more similar messages that are similar to the social media message, based on detecting the problem keyword identified in the social media message in the one or more similar messages;
   displaying the similar messages in a similar message recommendation list of a user interface, the similar message recommendation list including previous customer service response messages associated with each of the similar messages;
   receiving a user selection of a first one of the similar messages displayed in the similar message recommendation list; and
   reformatting the previous customer service response message corresponding to the first one of the similar messages as a draft response message addressed to an author of the social media message, and inserting the draft response message into a message composition window.

8. A method comprising:
accessing a social media message posted on a social media system, the social media message describing a product;
identifying a problem keyword in the social media message indicating a problem with the product, responsive to comparing text in the social media message to a list of known problem keywords;
classifying, using one or more processors, one or more articles in a knowledgebase repository as one or more relevant knowledgebase articles that are relevant to the social media message, based on detecting the problem keyword identified in the social media message in the one or more relevant knowledgebase articles;
displaying the relevant knowledgebase articles in a knowledgebase article list of a user interface;
receiving a user selection of a first one of the relevant knowledgebase articles displayed in the knowledgebase article list; and
attaching the first one of the relevant knowledgebase articles to a draft response message addressed to an author of the social media message in a message composition window.

9. The method of claim 8, further comprising:
detecting one or more keywords in the social media message, wherein the relevant knowledgebase articles are selected based at least in part on a detection of the one or more keywords in the relevant knowledgebase articles; and
displaying the keywords in a keyword list.

10. The method of claim 8, further comprising:
inserting a link to the first one of the relevant knowledgebase articles into the draft response message addressed to the author of the social media message in the message composition window.

11. The method of claim 8, further comprising:
receiving user feedback corresponding to one of the relevant knowledgebase articles displayed in the knowledgebase article list, the user feedback corresponding to positive user feedback or negative user feedback; and
adjusting the ordering of the knowledgebase article list, based on the user feedback.

12. The method of claim 11, further comprising:
storing the user feedback;
accessing a new social media message posted on the social networking platform;
determining that the new social media message contains keywords matching keywords of the social media message; and
generating a new knowledgebase article list corresponding to the new social media message, based at least in part on the stored user feedback.

13. A system comprising:
a communication module, comprising one or more processors, configured to access a social media message posted on a social media system, the social media message describing a product; and
a recommended knowledgebase module, comprising the one or more processors, configured to:
identify a problem keyword in the social media message indicating a problem with the product, responsive to comparing text in the social media message to a list of known problem keywords;
classify one or more articles in a knowledgebase repository as one or more relevant knowledgebase articles that are relevant to the social media message, based on detecting the problem keyword identified in the social media message in the one or more relevant knowledgebase articles;
display the relevant knowledgebase articles in a knowledgebase article list of a user interface;
receive a user selection of a first one of the relevant knowledgebase articles displayed in the knowledgebase article list; and
attach the first one of the relevant knowledgebase articles to a draft response message addressed to an author of the social media message in a message composition window.

14. A non-transitory machine-readable storage medium having embodied thereon instructions executable by one or more machines to perform operations comprising:
accessing a social media message posted on a social media system, the social media message describing a product;
identifying a problem keyword in the social media message indicating a problem with the product, responsive to comparing text in the social media message to a list of known problem keywords;
classifying one or more articles in a knowledgebase repository as one or more relevant knowledgebase articles that are relevant to the social media message, based on detecting the problem keyword identified in the social media message in the one or more relevant knowledgebase articles;
displaying the relevant knowledgebase articles in a knowledgebase article list of a user interface;
receiving a user selection of a first one of the relevant knowledgebase articles displayed in the knowledgebase article list; and
attaching the first one of the relevant knowledgebase articles to a draft response message addressed to an author of the social media message in a message composition window.

* * * * *